(12) United States Patent
Mitsunobu

(10) Patent No.: US 11,236,409 B2
(45) Date of Patent: Feb. 1, 2022

(54) COATED STEEL SHEET

(71) Applicant: NIPPON STEEL CORPORATION, Tokyo (JP)

(72) Inventor: Takuya Mitsunobu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 197 days.

(21) Appl. No.: 16/493,942

(22) PCT Filed: Mar. 16, 2018

(86) PCT No.: PCT/JP2018/010627
§ 371 (c)(1),
(2) Date: Sep. 13, 2019

(87) PCT Pub. No.: WO2018/169084
PCT Pub. Date: Sep. 20, 2018

(65) Prior Publication Data
US 2021/0079498 A1 Mar. 18, 2021

(30) Foreign Application Priority Data
Mar. 17, 2017 (JP) .............................. JP2017-053150

(51) Int. Cl.
C22C 18/04 (2006.01)
B32B 15/01 (2006.01)
C22C 21/10 (2006.01)
C23C 2/06 (2006.01)
C23C 2/12 (2006.01)
C23C 2/40 (2006.01)

(52) U.S. Cl.
CPC ............ C22C 18/04 (2013.01); B32B 15/012 (2013.01); B32B 15/013 (2013.01); C22C 21/10 (2013.01);
(Continued)

(58) Field of Classification Search
None
See application file for complete search history.

(56) References Cited

U.S. PATENT DOCUMENTS 6,235,410 B1 5/2001 Komatsu et al.
6,465,114 B1 10/2002 Honda et al.
(Continued)

FOREIGN PATENT DOCUMENTS

CA 2959289 A 3/2016
IN 201917033840 A 10/2019
(Continued)

OTHER PUBLICATIONS

International Search Report for PCT/JP2018/010627 (PCT/ISA/210) dated May 1, 2018.
(Continued)

Primary Examiner — Daniel J. Schleis
(74) Attorney, Agent, or Firm — Solaris Intellectual Property Group, PLLC

(57) ABSTRACT

A coated steel sheet including a steel sheet and a coating layer provided on at least part of the surface of the steel sheet, in which the coating layer has a predetermined chemical composition in terms of % by mass, and the coating layer has a granular $Mg_2Sn$ phase-containing structure in an area fraction of from 5 to 65%, and a structure containing a solid solution of Zn and Al, and the granular $Mg_2Sn$ phase-containing structure is a structure constituted with a Zn phase and a granular $Mg_2Sn$ phase having a crystal grain size of less than 1 μm dispersed in the Zn phase.

18 Claims, 3 Drawing Sheets

(52) U.S. Cl.
CPC ............... *C23C 2/06* (2013.01); *C23C 2/12* (2013.01); *C23C 2/40* (2013.01); *Y10T 428/12799* (2015.01)

(56) References Cited

U.S. PATENT DOCUMENTS

2015/0361538 A1    12/2015   Yoshida et al.
2018/0171460 A1    6/2018   Tokuda

FOREIGN PATENT DOCUMENTS

| | | |
|---|---|---|
| JP | 46-7161 | 2/1971 |
| JP | 10-306357 A | 11/1998 |
| JP | 2001-64759 A | 3/2001 |
| JP | 2001-239383 A | 9/2001 |
| JP | 2001-329383 A | 11/2001 |
| JP | 2002-180225 A | 6/2002 |
| JP | 20020180225 * | 6/2002 |
| JP | 2003-253416 A | 9/2003 |
| JP | 2005-36304 A | 2/2005 |
| JP | 2015-214747 A | 12/2015 |
| WO | WO 2014/155944 A1 | 10/2014 |
| WO | WO 2016/035200 A1 | 3/2016 |

OTHER PUBLICATIONS

Written Opinion of the International Searching Authority for PCT/JP2018/010627 (PCT/ISA/237) dated May 1, 2018.

\* cited by examiner

[Fig. 1]
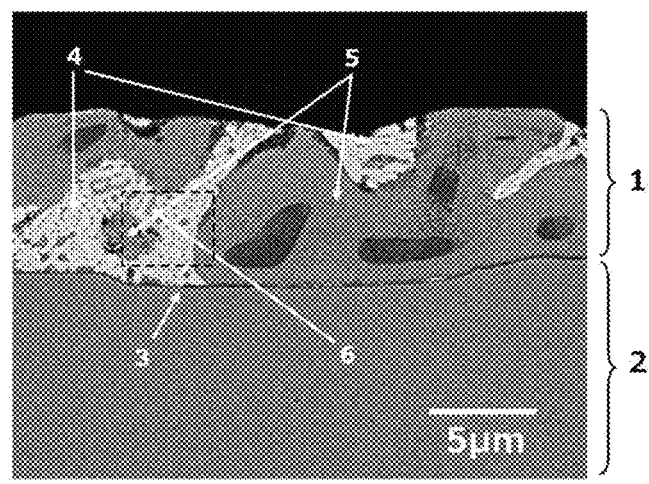
[Fig. 2]
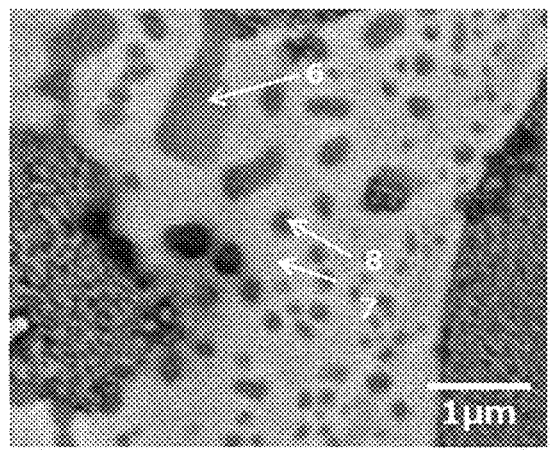

[Fig. 3]
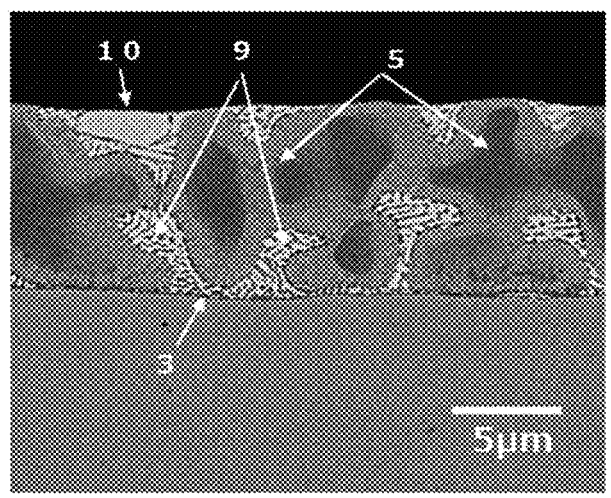
[Fig. 4]
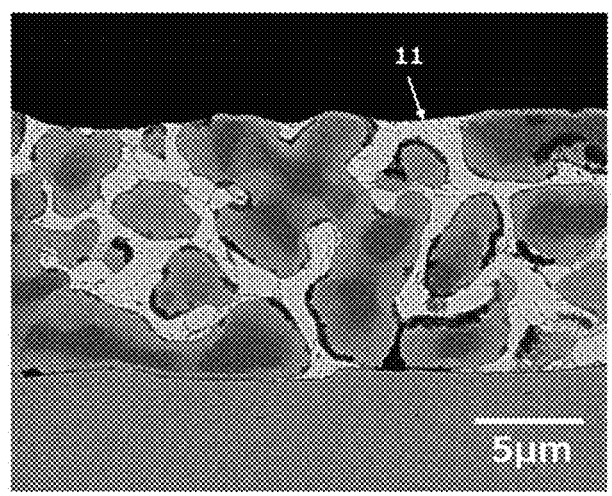

[Fig. 5]
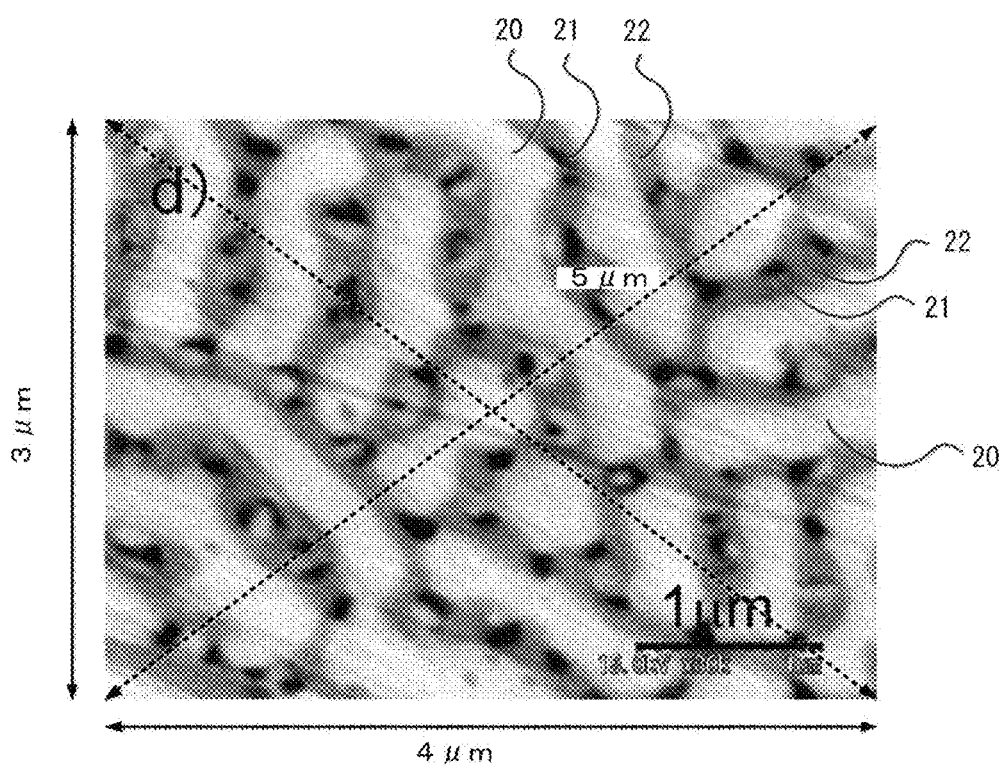

COATED STEEL SHEET

TECHNICAL FIELD

The present disclosure relates to a coated steel sheet.

BACKGROUND ART

In recent years, a coated steel sheet is used as an automobile structural member from the viewpoint of rust prevention, and an alloyed hot-dip zinc-coated steel sheet is mainly applied in the Japanese market. The alloyed hot-dip zinc-coated steel sheet is a coated steel sheet for which firstly hot-dip zinc-coating is performed on a steel sheet and then an alloying heat treatment is performed thereon such that the weldability and corrosion resistance after painting are improved by means of diffusion of Fe from the steel sheet (substrate steel sheet) in the coating layer. For example, a coated steel sheet described in Patent Literature 1 is representatively used as a coated steel sheet for automobiles in Japan.

Usually, a coated steel sheet for automobile is used in a state formed into a complex shape from a sheet form, therefore it is in many cases subjected to press forming. In the case of an alloyed hot-dip zinc-coated steel sheet, the coating layer becomes hard due to diffusion of Fe from the substrate steel sheet. Therefore, the coating layer is easily detached, and there is a unique problem such as powdering or flaking that is not experienced in a hot-dip zinc-coated steel sheet having a soft coating layer.

Further, in the case of a coated steel sheet provided with a hard coating layer, the coating layer is prone to be damaged by an external pressure, and once a crack is generated, the crack propagates to an interface between the coating layer and the steel substrate (steel sheet). And it is regarded as a problem that the coating layer is prone to be detached from the interface with the steel substrate (steel sheet) as a starting point to cause falling.

For example, when an alloyed hot-dip zinc-coated steel sheet is used for an automobile outer panel, the steel substrate (steel sheet) tends to be exposed due to simultaneous detachment a paint and a coating layer by an impingement of a stone (chipping) kicked up by a traveling vehicle. Therefore, its corrosion may be more severe than a coated steel sheet provided with a soft coating layer which is not alloyed.

Furthermore, in relation to rust prevention, the alloyed hot-dip zinc-coated steel sheet contains Fe in the coating layer. Therefore, when such chipping occurs, reddish-brown rust is readily generated due to corrosion of the coating layer, which causes a problem on the appearance of the automobile.

As a solution to these problems, it is effective to apply a coated steel sheet with a coating layer having a favorable toughness and not containing Fe. For example, as an automobile coated steel sheet with a coating layer not containing Fe, a hot-dip zinc-coating steel sheet is mainly used in North America, Europe, etc. In this regard, a hot-dip zinc-coating steel sheet which has not undergone an alloying treatment is resistant to chipping. In addition, since Fe is not contained in the coating layer in contrast to an alloyed hot-dip zinc-coated steel sheet, red rust in the initial stage of corrosion is also less likely to appear. However, when it is painted, the coating layer is easily corroded under the paint film to raise the paint film (blistering). Consequently, a hot-dip zinc-coating steel sheet is by no means suitable for an automobile coated steel sheet.

As a method of enhancing the corrosion resistance of a hot-dip Zn coating, there is, for example, a method of adding Al in the Zn coating layer. In the building materials field, as disclosed in Patent Literature 2, as a high corrosion resistance coated steel sheet, a hot-dip Al—Zn coated steel sheet is widely put to practical use. The coating layer of such a hot-dip Al—Zn coated steel sheet is constituted with a dendrite-like α-Al phase (dendritic structure) crystallized first from the molten state, and a structure consisting of a Zn phase and an Al phase formed in the interstices of the dendritic structures (interdendritic structure). The dendritic structure is passivated, and the interdendritic structure has a higher Zn concentration than the dendritic structure. Therefore, corrosion concentrates on the interdendritic structure.

As a result, corrosion propagates through the interdendritic structure in a moth-eaten pattern, and corrosion propagation paths become complicated, which makes it difficult for the corrosion to reach the steel substrate (steel sheet).

For this reason, when a hot-dip Al—Zn coated steel sheet is used as a not-painted bare material, its corrosion resistance is superior to a hot-dip zinc-coated steel sheet having the same thickness of the coating layer.

When such a hot-dip Al—Zn coated steel sheet is used as an automobile outer panel, the coated steel sheet is supplied to an automobile manufacturer, etc. in a state having been already coated in a continuous hot-dip metal coating facility. Therefore, it is common that the integral painting for an automobile including chemical conversion, electropainting, intermediate painting, and top coat painting is conducted after the coated steel sheet is processed into a panel part shape.

It has been also studied to add Mg to a Zn—Al coating layer for the purpose of improving the corrosion resistance. For example, Patent Literature 3 discloses a hot-dip Zn—Al—Mg coated steel sheet in which the corrosion resistance is improved by forming a $Zn/Al/MgZn_2$ ternary eutectic structure containing a Mg compound such as $MgZn_2$ in a coating layer. It is considered that the inclusion of Mg improves the sacrificial corrosion protection property of the coating layer to improve the anticorrosion effect of the steel substrate.

Patent Literature 4 discloses a hot-dip Al—Zn coated steel sheet in which the corrosion resistance after painting is improved by breaking down a passive state of the dendritic structure by inclusion of Sn or In.

Further, Patent Literature 5 and 6 describe a hot-dip Al—Zn alloy coated steel sheet which contains Mg and Sn in combination. In Patent Literature 5 and 6, it is described that the hot-dip Al—Zn alloy coated steel sheet is superior in corrosion resistance after painting and/or workability.

Patent Literature 1: Japanese Patent Application Laid-Open (JP-A) No. 2003-253416
Patent Literature 2: JP-B No. S46-7161
Patent Literature 3: JP-A No. 2001-329383
Patent Literature 4: Japan International Publication No. WO2014/155944
Patent Literature 5: JP-A No. 2015-214747
Patent Literature 6: JP-A No. 2002-180225

SUMMARY OF INVENTION

Technical Problem

However, when the outer panel using the hot-dip Al—Zn coated steel sheet described in Patent Literature 2 is damaged at the paint film and the coating layer (when the steel substrate is exposed), preferential dissolution of Zn (selective corrosion of the interdendritic structure) occurs at the interface between the paint film and the coating layer starting from the damaged area due to a unique phase structure of the coating layer consisting of the above described two structures of dendritic structure and interdendritic structure. This propagates deep into the sound area of the painting to cause a large paint film blister. As a result, there arises a well-known problem that sufficient corrosion resistance (corrosion resistance after painting) cannot be secured.

Further, the interdendritic structure has lower hardness than the dendritic structure. Therefore, due to the difference in the hardness between the interdendritic structure and the dendritic structure, deformation is concentrated in the interdendritic structure during press working. As a result, it is known that a crack is developed in the coating layer to reach the steel substrate. Since corrosion is promoted in the vicinity of a crack where the steel substrate is exposed, the corrosion resistance after painting at a processed area has not been satisfactory.

Further, a $MgZn_2$ phase included in the coating layer of the hot-dip Zn—Al—Mg coated steel sheet described in Patent Literature 3 is brittle. Therefore, when the coated steel sheet is subjected to processing, there is a risk that a large number of cracks may be generated starting from the $Zn/Al/MgZn_2$ ternary eutectic structure. Since the steel substrate is exposed when cracks are generated, there has been also a problem that the corrosion resistance after painting at a processed area cannot be secured.

In the case of the hot-dip Al—Zn coated steel sheet described in Patent Literature 4, Mg is not contained in the coating layer, and any attempt to reduce the corrosion rate of the coating layer itself has been made. Therefore, it is conceivable that the corrosion resistance after painting is not satisfactory as an automobile coated steel sheet.

Further, with respect to the hot-dip Al—Zn alloy coated steel sheet described in Patent Literature 5 and 6, control of the coating structure has not been sufficiently studied, and therefore it is presumed that a $MgZn_2$ phase is formed as a brittle Mg-containing intermetallic compound in the coating layer.

In this case, the resulting hot-dip Al—Zn alloy coated steel sheet is inferior in workability, and causes a crack in the coating layer at the time of pressing. Therefore, it is considered that corrosion propagates in the processed area starting from the crack.

It is guessed that these hot-dip Al—Zn alloy coated steel sheets do not have workability or corrosion resistance after painting satisfactory as a coated steel sheet for an automobile.

That is, a coated steel sheet that has both corrosion resistance after painting and workability has heretofore not been developed, and in particular, a coated steel sheet suitable for automotive applications has not been in existence.

An object of an aspect of the present disclosure is to provide a coated steel sheet excellent in corrosion resistance after painting and workability.

Solution to Problem

The method of attaining the object includes the following aspects.

<1> A coated steel sheet including a steel sheet and a coating layer provided on at least a part of a surface of the steel sheet, wherein:
the coating layer has a chemical composition including in terms of % by mass:
Al: from 15% to 60%
Mg: from 0.5% to 8.0%
Sn: from 0.5% to 20.0%
Si: from 0.05% to 1.50%
Bi: from 0% to 5.0%,
In: from 0% to 2.0%,
Ca: from 0% to 3.0%,
Y: from 0% to 0.5%,
La: from 0% to 0.5%,
Ce: from 0% to 0.5%,
Cr: from 0% to 0.25%,
Ti: from 0% to 0.25%,
Ni: from 0% to 0.25%,
Co: from 0% to 0.25%,
V: from 0% to 0.25%,
Nb: from 0% to 0.25%,
Cu: from 0% to 0.25%,
Mn: from 0% to 0.25%,
Sr: from 0% to 0.5%,
Sb: from 0% to 0.5%,
Pb: from 0% to 0.5%,
B: from 0% to 0.5%, and
a balance consisting of Zn and impurities, wherein:
the coating layer has a granular $Mg_2Sn$ phase-containing structure in an area fraction of from 5 to 65%, and a structure containing a solid solution of Zn and Al, and
the granular $Mg_2Sn$ phase-containing structure is a structure constituted with a Zn phase and a granular $Mg_2Sn$ phase having a crystal grain size of less than 1 μm dispersed in the Zn phase.

<2> The coated steel sheet according to <1> above, wherein a content of Mg is from 0.5% to 3.0%, and a content of Sn is from 1.0% to 7.5% in terms of % by mass.

<3> The coated steel sheet according to <1> or <2> above, wherein a content of Al is from 20% to 60%, a content of Mg is from 1.0% to 2.0%, a content of Sn is from 1.0% to 5.0%, and a content of Si is from 0.05% to 1.0% in terms of % by mass.

<4> The coated steel sheet according to any one of <1> to <3> above, wherein a content of Sn and a content of Mg satisfy the following Formula (1):

$$Mg \le Sn \le 2.5 \times Mg \qquad \text{Formula (1)}$$

wherein, in Formula (1), each atomic symbol indicates a content of the element in terms of % by mass.

<5> The coated steel sheet according to any one of <1> to <4> above, wherein the area fraction of the granular $Mg_2Sn$ phase-containing structure is from 20% to 60%.

<6> The coated steel sheet according to any one of <1> to <5> above, wherein the area fraction of the granular $Mg_2Sn$ phase-containing structure is from 30% to 60%.

<7> The coated steel sheet according to any one of <1> to <6> above, wherein an area fraction of the structure containing a solid solution of Zn and Al is from 35% to 95%.

<8> The coated steel sheet according to any one of <1> to <7> above, wherein the coating layer has a massive $MgZn_2$ phase with an equivalent circle diameter of 1 μm or more in an area fraction of from 0% to 20%.

<9> The coated steel sheet according to any one of <1> to <8> above, wherein the coating layer has a massive $MgZn_2$ phase with an equivalent circle diameter of 1 μm or more in an area fraction of from 0% to 5%.

<10> The coated steel sheet according to any one of <1> to <9> above, wherein the coating layer has a massive Zn phase with an equivalent circle diameter of 2 μm or more in an area fraction of from 0% to 20%.

<11> The coated steel sheet according to any one of <1> to <10> above, wherein the coating layer has a massive Zn phase with an equivalent circle diameter of 2 μm or more in an area fraction of from 0% to 10%.

<12> The coated steel sheet according to any one of <1> to <11> above further including an interfacial alloy layer with a thickness of from 100 nm to 1.5 µm consisting of an Al—Fe intermetallic compound between the steel sheet and the coating layer.

Advantageous Effects of Invention

In an aspect of the present disclosure, a coated steel sheet excellent in corrosion resistance after painting and workability can be provided.

BRIEF DESCRIPTION OF DRAWINGS

FIG. 1 is a backscattered electron image (BSE image) taken with an SEM at a magnification of 2000× on an example of the coating layer of the coated steel sheet according to the present disclosure (No. 29 of Example).

FIG. 2 is an enlarged view of the region A in FIG. 1.

FIG. 3 is a backscattered electron image (BSE image) taken with an SEM at a magnification of 2000× on the coating layer of the coated steel sheet of No. 31 of Example.

FIG. 4 is a backscattered electron image (BSE image) taken with an SEM at a magnification of 2000× on the coating layer of the coated steel sheet of No. 32 of Example.

FIG. 5 is a backscattered electron image (BSE image) with an SEM of a cross section of a coating layer for explaining a method of identifying a Zn/Al/MgZn$_2$ ternary eutectic structure and measuring the area fraction of the same.

DESCRIPTION OF EMBODIMENTS

An example of the present disclosure will be described below.

In the present disclosure, the indication of "%" with respect to the content of each element in a chemical composition means "% by mass".

A numerical range expressed by "x to y" includes the values of x and y in the range as the minimum and maximum values, respectively.

In a case "less than" or "more than" is affixed to the above x or y, such x or y is not included in the range as the minimum or maximum value.

The content of an element of a chemical composition may be expressed as the amount of an element (for example, the amount of Zn, the amount of Mg, or the like), or the concentration of an element (for example, the concentration of Zn, the concentration of Mg, or the like).

The "corrosion resistance after painting" refers to the corrosion resistant property of the coating layer itself.

The "sacrificial corrosion protection property" refers to a property of suppressing the corrosion of an area where a steel substrate is exposed (for example, a cut end surface of a coated steel sheet, an area where cracking occurred during processing, or an area where a steel substrate was exposed by detachment of the coating layer).

The "equivalent circle diameter" is a diameter of a circle having the same area as the region defined by the outline of a phase, which is identified in a cross section of a coating layer (a cross section cut in the thickness direction of the coating layer).

"C direction" means the direction perpendicular to the rolling direction of a steel sheet.

"L direction" means the direction parallel to the rolling direction of a steel sheet.

The coated steel sheet of the present disclosure includes a steel sheet and a coating layer provided on at least part of the surface of the steel sheet.

The coating layer has a predetermined chemical composition. In addition, the coating layer has a granular Mg$_2$Sn phase-containing structure in an area fraction of from 5 to 65%, and a structure containing a solid solution of Zn and Al (hereinafter, for convenience, also referred to as "dendritic structure).

The granular Mg$_2$Sn phase-containing structure is a structure constituted with a Zn phase and a granular Mg$_2$Sn phase having a crystal grain size of less than 1 µm dispersed in the Zn phase.

The coated steel sheet of the present disclosure can be a coated steel sheet that is superior in corrosion resistance after painting and workability by virtue of the above constitution. The coated steel sheet of the present disclosure was invented based on the following findings.

The inventors investigated the corrosion resistance after painting and the workability of a coating layer suitable for a coated steel sheet for automotive applications, building materials applications, etc. As a result, the following findings were obtained.

Although the Mg-containing intermetallic compound constitutes a brittle phase, a Mg$_2$Sn phase has more favorable plastic deformability as compared to a MgZn$_2$ phase. By forming a phase in which the Mg$_2$Sn phase is finely dispersed in a Zn phase having favorable plastic deformability, the structure as a whole expresses favorable plastic deformability, which contributes to improvement of the workability.

In addition, the Mg$_2$Sn phase serves as a supply source of Mg ions in a corrosive environment, and since Mg ions make the corrosion product to an insulating film, corrosion under the paint film in a painted state may be suppressed.

Therefore, when a granular Mg$_2$Sn phase-containing structure constituted with a Zn phase and a granular Mg$_2$Sn phase having a crystal grain size of less than 1 µm dispersed in the Zn phase is made to be present at a predetermined amount in terms of area fraction, both the corrosion resistance after painting and the workability are enhanced. Specifically, when the area fraction of the granular Mg$_2$Sn phase-containing structure is 5% or more, the workability and the corrosion resistance after painting become superior to a commercially available coated steel sheet.

From the above findings, it has been found that the coated steel sheet of the present disclosure is a coated steel sheet superior in corrosion resistance after painting and workability.

In addition, since the coated steel sheet of the present disclosure has a granular layer-dispersed structure that exhibits plastic deformability be present in the coating layer, it can be also superior in resistance to chipping and attain extension of the lifetime of a coated steel sheet after painting.

The coated steel sheet of the present disclosure contains a predetermined amount of Al in the coating layer, and has a dendritic structure that raises the melting point of the coating layer. Therefore, it can be also superior in resistance to seizure, and can suppress the coating layer from sticking to a press mold during press molding. That is, it is possible for the coated steel sheet of the present disclosure to be superior in both corrosion resistance after painting and press formability.

In particular, in the case of a coated steel sheet for automotive use, the workability and the period until onset of paint film blistering or red rusting from a cut are regarded as important. Therefore, a coated steel sheet having a coating layer superior in corrosion resistance after painting and workability is suitable for automotive applications.

The coated steel sheet of the present disclosure will be described in detail below.

First, a steel sheet will be described.

There is no particular restriction on a steel sheet used as an original sheet for coating, and various steel sheets of an Al-killed steel, an ultra-low carbon steel, a high carbon steel, various high tensile strength steels, a Ni, Cr-containing steel, or the like can be used. There is no particular restriction on a steelmaking method, the strength of a steel, or a pretreatment of steel sheet, such as a hot rolling method, a pickling method, or a cold rolling method.

There is also no particular restriction on the chemical composition (C, Si, etc.) of a steel sheet. It has not been confirmed that elements such as Ni, Mn, Cr, Mo, Ti, or B contained in the steel sheet affect the coating layer.

Next, a coating layer will be described.

First, the chemical composition of a coating layer will be described.

The chemical composition of a coated steel sheet includes Al, Mg, Sn, and Si as essential elements, and the balance is Zn and impurities. The chemical composition of a coated steel sheet may include at least one of Bi, In, Ca, Y, La, Ce, Cr, Ti, Ni, Co, V, Nb, Cu, Mn, Sr, Sb, Pb and B as an optional element. That is, the optional element needs not be contained.

The content of each element in the coating layer means the average content of each element contained in the entire coating layer.

[Al: from 15% to 60%]

Al is an essential element for improving the corrosion resistance after painting and the seizure resistance of a coating layer. Most of Al is present as an Al phase inside a dendritic structure in the coating layer.

The dendritic structure described later is not passivated due to the effect of Sn contained, and in a state not to become a factor for decreasing the corrosion resistance after painting. Meanwhile, when the melting point of the coating layer is low, there arises a problem of seizure of a metal in the coating layer with a press mold. However, as the Al concentration becomes higher, the area fraction of the dendritic structure that is a high melting point structure increases. Therefore, as a result, it is possible to suppress the coating layer from sticking to the press mold at the time of press molding (namely, the resistance to seizure is improved).

The Al concentration required to secure the area fraction of the dendritic structure capable of developing sufficient resistance to seizure is 15% or more. Therefore, the lower limit of the Al concentration is set at 15%. A preferable Al concentration is 20% or more.

Meanwhile, when the Al concentration exceeds 60%, an "interfacial alloy layer composed of an Al—Fe intermetallic compound" formed at the interface between a coating layer and a steel substrate described later grows excessively to impair the workability. Therefore, the upper limit of the Al concentration is set at 60%. A preferable Al concentration is 40% or less.

[Mg: from 0.5% to 8.0%]

Mg is an essential element for forming a granular $Mg_2Sn$ phase-containing structure in a coating layer to impart favorable corrosion resistance after painting and workability to the coating layer. Mg is present in the coating layer in a form of a Mg-containing intermetallic compound, and dissolved into a corrosive environment as Mg ions under a corrosive environment. Mg ions convert a Zn-based corrosion product to an insulating film, and rust to a barrier film. From the above, penetration of a corrosion factor into the coating layer and under the paint film can be suppressed so as to contribute to improvement of the corrosion resistance after painting. Most of Mg is contained in a granular $Mg_2Sn$ phase-containing structure. The formation of the granular $Mg_2Sn$ phase-containing structure improves both the corrosion resistance after painting and the workability. The Mg concentration required to improve the corrosion resistance after painting and the workability is 0.5%. Therefore, the lower limit of the Mg concentration is set at 0.5%. A preferable Mg concentration is 1.0% or more.

Meanwhile, when the Mg concentration exceeds 8.0%, a massive $MgZn_2$ phase described later is excessively generated to impair the workability. Therefore, the upper limit of the Mg concentration is set at 8.0%. From the viewpoint of suppressing formation of the massive $MgZn_2$ phase that impairs the workability, a preferable Mg concentration is 3.0% or less. A more preferable Mg concentration is 2.0% or less.

[Sn: from 0.5% to 20.0%]

Sn is an essential element for forming a granular $Mg_2Sn$ phase-containing structure in a coating layer together with Mg to impart favorable corrosion resistance after painting and workability to the coating layer. Further, Sn is an element having an effect of suppressing formation of a massive $MgZn_2$ phase together with a $Zn/Al/MgZn_2$ ternary eutectic structure.

Therefore, Sn is also an element that enhances the corrosion resistance after painting and the workability of the coating layer.

When the Sn concentration is low, it becomes difficult to form a granular $Mg_2Sn$ phase-containing structure, while the generation amounts of a $Zn/Al/MgZn_2$ ternary eutectic structure and a massive $MgZn_2$ phase increase. As a result, the corrosion resistance after painting and the workability of the coating layer tend to decrease. Therefore, the lower limit of the Sn concentration is set at 0.5%. From the viewpoint of sufficiently forming a granular $Mg_2Sn$ phase-containing structure and sufficiently suppressing formation of a $Zn/Al/MgZn_2$ ternary eutectic structure and a massive $MgZn_2$ phase, a preferable Sn concentration is 0.1% or more, and a more preferable Sn concentration is 1.5% or more.

Meanwhile, when the Sn concentration is excessive, the surplus Sn crystallizes as a potentially nobler Sn phase to decrease the corrosion resistance after painting. Therefore, the upper limit of the Sn concentration is set at 20.0%. From the viewpoint of improving the corrosion resistance after painting, a preferable Sn concentration is 7.5% or less, and a more preferable Sn concentration is 5.0% or less.

[Si: from 0.05% to 1.50%]

Si, when contained in a coating bath, is an element that suppresses the reactivity of Zn and Al contained in the coating bath with Fe element in an original sheet for coating. That is, Si is an essential element to control the formation behavior of an interfacial alloy layer composed of an Al—Fe intermetallic compound having an effect on the adhesion and workability of the coating layer (in particular, an interfacial alloy layer containing or consisting of $Fe_2Al_5$) by controlling the reactivity between the coating layer and the steel substrate. The minimum Si concentration necessary for suppressing the interfacial alloy layer is 0.05%.

When the Si concentration is less than 0.05%, an interfacial alloy layer grows immediately after dipping an original sheet for coating in the coating bath to make it difficult for the coating layer to acquire favorable ductility, and therefore the workability tends to decrease. Consequently, the lower limit of the Si concentration is set at 0.05%. A preferable Si concentration is 0.2% or more.

Meanwhile, when the Si concentration exceeds 1.50%, a potentially nobler Si phase remains in the coating layer, and functions as a cathode zone in corrosion. As a result, it leads to decrease in corrosion resistance after painting. Therefore, the upper limit of the Si concentration is set at 1.50%. A preferable Si concentration is 1.0% or less.

In this regard, Si may occasionally exist in the coating layer as a $Mg_2Si$ phase which is an intermetallic compound with Mg, but insofar as the area fraction of the $Mg_2Si$ phase is 5% or less, it does not affect the performance at all.

[Bi: from 0% to 5.0%]

Bi is an element contributing to improvement of the workability. Therefore, the lower limit of the Bi concentration should be more than 0% (preferably 0.1% or more, and more preferably 3.0% or more).

Meanwhile, when the Bi concentration excessively increases, the corrosion resistance after painting tends to deteriorate. Therefore, the upper limit of the Bi concentration should be 5.0% or less (preferably 0.5% or less, and more preferably 0.1% or less).

[In: from 0% to 2.0%]

In is an element contributing to improvement of the workability. Therefore, the lower limit of the In concentration should be more than 0% (preferably 0.1% or more, and more preferably 3.0% or more).

Meanwhile, when the In concentration increases, the corrosion resistance after painting tends to deteriorate. Therefore, the upper limit of the In concentration is set at 2.0% or less (preferably 0.3% or less).

[Ca: from 0% to 3.0%]

Ca is an element capable of adjusting the Mg dissolution amount optimum for imparting corrosion resistance after painting and sacrificial corrosion protection property. Therefore, the lower limit of the Ca concentration should be more than 0% (preferably 0.05% or more).

Meanwhile, when the Ca concentration increases, the corrosion resistance after painting and the workability tend to deteriorate. Therefore, the upper limit of the Ca concentration is set at 3.00% or less (preferably 1.0% or less).

[Y: from 0% to 0.5%]

Y is an element contributing to improvement of the workability. Therefore, the lower limit of the Y concentration should be more than 0% (preferably 0.1% or more).

Meanwhile, when the Y concentration increases, the corrosion resistance after painting tends to deteriorate. Therefore, the upper limit of the Y concentration is set at 0.5% or less (preferably 0.3% or less).

[La and Ce: from 0% to 0.5%]

La and Ce are elements contributing to improvement of the workability.

Therefore, the lower limits of the La concentration and the Ce concentration should be respectively more than 0% (preferably 0.1% or more).

Meanwhile, when the La concentration and the Ce concentration increase, the corrosion resistance after painting tends to deteriorate. Therefore, the upper limits of the La concentration and the Ce concentration are respectively set at 0.5% or less (preferably 0.3% or less).

[Cr, Ti, Ni, Co, V, Nb, Cu, and Mn: from 0% to 0.25%]

Cr, Ti, Ni, Co, V, Nb, Cu, and Mn are elements contributing to improvement of the workability. Therefore, the lower limits of the concentrations of Cr, Ti, Ni, Co, V, Nb, Cu, and Mn should be respectively more than 0% (preferably 0.05% or more, and more preferably 0.1% or more).

Meanwhile, when the concentrations of Cr, Ti, Ni, Co, V, Nb, Cu, and Mn increase, the corrosion resistance after painting tends to deteriorate. Therefore, the upper limits of the concentration of Cr, Ti, Ni, Co, V, Nb, Cu, and Mn are respectively set at 0.25% or less.

[Sr, Sb, Pb, and B: from 0% to 0.5%]

Sr, Sb, Pb, and B are elements contributing to improvement of the workability. Therefore, the lower limits of the concentrations of Sr, Sb, Pb, and B should be respectively more than 0 (preferably 0.05% or more, and more preferably 0.1% or more).

Meanwhile, when the concentrations of Sr, Sb, Pb, and B increase, the corrosion resistance after painting tends to deteriorate. Therefore, the upper limits of the concentrations of Sr, Sb, Pb, and B are respectively set at 0.5% or less (preferably 0.1% or less).

[The Balance: Zn and Impurities]

The balance of the chemical composition of the coating layer is Zn and impurities.

Zn is contained in the coating layer at a certain concentration or more in order to properly secure the sacrificial protection performance of the coating layer, the corrosion resistance after painting, and the painting substrate treatment property. From these viewpoints, the chemical composition of the coating layer is mostly occupied by Al and Zn.

The impurities refer to components included in a raw material or components entered in the production process, which are not intentionally added. For example, a small amount of a component such as Fe may be mixed in into the coating layer as an impurity due to mutual atomic diffusion between the steel substrate (steel sheet) and the coating bath.

For example, when a coating layer is formed by a hot-dip metal coating method, the coating layer may contain Fe at a certain concentration as an impurity. It has been confirmed that the performance is not adversely affected by Fe up to a concentration in the coating layer of 3.0%.

[Preferred Chemical Composition of Coating Layer]

In the chemical composition of a coating layer, the content of Mg is preferably from 0.5% to 3.0%, and the content of Sn is preferably from 1.0% to 7.5%. When the Mg concentration and Sn concentration are in the above ranges, the corrosion resistance after painting and the workability are further improved.

In particular, it is preferable that the content of Al is from 20% to 60%, the content of Mg is from 1.0% to 2.0%, the content of Sn is from 1.0% to 5.0%, and the content of Si is from 0.05% to 1.0% in the chemical composition of a coating layer. When the Al concentration, Mg concentration, Sn concentration, and Si concentration are in the above ranges, the corrosion resistance after painting and the workability are further improved. In addition, the resistance to seizure is also further improved.

[Formula (1): Mg % by Mass≤Sn % by Mass≤2.5× Mg % by Mass]

In order to further improve the corrosion resistance after painting and the workability, it is preferable that a granular $Mg_2Sn$ phase-containing structure is sufficiently formed, and the formation of a $Zn/Al/MgZn_2$ ternary eutectic structure and a massive $MgZn_2$ phase is sufficiently suppressed.

For this purpose, the content of Sn and the content of Mg preferably satisfy the following Formula (1), and more preferably satisfy the following Formula (2).

$$Mg \leq Sn \leq 2.5 \times Mg \qquad \text{Formula (1)}$$

$$1.5 \times Mg \leq Sn \leq 2.0 \times Mg \qquad \text{Formula (2)}$$

In Formula (1) and Formula (2), each atomic symbol indicates the content of the element in terms of % by mass.

When the Sn concentration does not satisfy Formula (1) and there is a shortage of Sn with respect to Mg, a massive MgZn$_2$ phase is formed, and the corrosion resistance after painting tends to decrease together with the workability.

Meanwhile, when the Sn concentration does not satisfy the Formula (1) and there is a surplus of Sn with respect to Mg, a potentially nobler Sn phase crystallizes, and the corrosion resistance after painting tends to decrease.

Next, the metallographic structure of a coating layer will be described.

The coating layer has a granular Mg$_2$Sn phase-containing structure and a dendritic structure (structure containing a solid solution of Zn and Al).

And, the coating layer has in some cases a massive MgZn$_2$ phase with an equivalent circle diameter of 1 μm or more, a massive Zn phase with an equivalent circle diameter of 2 μm or more, a Zn/Al/MgZn$_2$ ternary eutectic structure, or the like as a structure other than the granular Mg$_2$Sn phase-containing structure Here, FIG. 1 shows a backscattered electron image (BSE image) of an example of the coating layer of the coated steel sheet of the present disclosure taken with an SEM at a magnification of 2000×.

As shown in FIG. 1, the coated steel sheet has, for example, a coating layer 1, a steel sheet 2, and an interfacial alloy layer 3 composed of an Al—Fe intermetallic compound between the coating layer 1 and the steel sheet 2.

The structure of the coating layer 1 is mainly constituted with a granular Mg$_2$Sn phase-containing structure 4, and a dendritic structure 5. Further, as shown in FIG. 2, which is an enlarged view of the region A in FIG. 1, the granular Mg$_2$Sn phase-containing structure 4 has a structure in which a granular Mg$_2$Sn phase 8 with a crystal grain size of less than 1 μm is dispersed in a Zn phase 7.

In FIG. 1, the dendritic structure 5 corresponds to the gray-colored region as well as the black-colored region surrounded by the former region. The difference in color between the two regions is due to the difference in the Al concentrations. Specifically, the dendritic structure 5 with a low Al concentration is the gray-colored region, and the gray-colored dendritic structure 5 with a high Al concentration is the black-colored region.

In addition to the granular Mg$_2$Sn phase-containing structure 4 and the dendritic structure 5, the coating layer 1 may occasionally contain a massive MgZn$_2$ phase 6 (see FIG. 1 and FIG. 2), a massive Zn phase 10 (see FIG. 3), and a Zn/Al/MgZn$_2$ ternary eutectic structure 9 (see FIG. 3).

[Granular Mg$_2$Sn Phase-Containing Structure: Area Fraction from 5 to 65%]

The granular Mg$_2$Sn phase-containing structure is constituted with a Zn phase and a granular Mg$_2$Sn phase having a crystal grain size of less than 1 μm dispersed in the Zn phase. That is, in the granular Mg$_2$Sn phase-containing structure, the granular Mg$_2$Sn phase is contained (that is, included) in the Zn phase.

The crystal grain size of the granular Mg$_2$Sn phase is an equivalent circle diameter.

More specifically, the granular Mg$_2$Sn phase-containing structure is a structure in which the granular Mg$_2$Sn phase with a crystal grain size of less than 1 μm is dispersed in the Zn phase at a number density of from 1 to 25/μm$^2$.

When the crystal grain size of the granular Mg$_2$Sn phase is less than 1 μm, the stress to be exerted on the boundary between the granular Mg$_2$Sn phase and the Zn phase can be suppressed. For this reason, it is possible to sufficiently maintain the plastic deformability of the granular Mg$_2$Sn phase while preventing the granular Mg$_2$Sn phase from becoming a starting point of crack generation. Meanwhile, when the crystal grain size of the granular Mg$_2$Sn phase exceeds 1 μm, the stress to be exerted on the boundary between the granular Mg$_2$Sn phase and the Zn phase increases and there arises a risk that the granular Mg$_2$Sn phase may become a starting point of crack generation, which is not preferable.

There is no particular restriction on the average composition of the entire granular Mg$_2$Sn phase-containing structure, and, for example, the Mg concentration is from 1 to 10% by mass, the Sn concentration is from 1 to 25% by mass, and the Al concentration is from 1 to 8% by mass, while the balance consists of Zn, and impurities of less than about 2% by mass. The composition of the entire granular Mg$_2$Sn phase-containing structure may also include the above-mentioned optional elements that can be included in the chemical composition of the coating layer.

In this regard, in the present disclosure, a granular phase of an intermetallic compound corresponding to any of the following (1) to (5) is also regarded as the granular Mg$_2$Sn phase.

(1) Mg$_2$Sn in which an element such as Si is interstitially dissolved;

(2) Mg$_9$Sn$_5$ formed through transformation of a Mg$_2$Sn phase;

(3) Substituted Mg$_2$Sn and Mg$_9$Sn$_5$ (substitution product of Mg$_2$Sn and Mg$_9$Sn$_5$) in which at least one of Bi, In, Cr, Ti, Ni, Co, V, Nb, Cu, and Mn is substituted for part of Sn;

(4) Substituted Mg$_2$Sn and Mg$_9$Sn$_5$ (substitution product of Mg$_2$Sn and Mg$_9$Sn$_5$) in which at least one of Ca, Y, La and Ce is substituted for part of Mg;

(5) Substituted Mg$_2$Sn and Mg$_9$Sn$_5$ (substitution product of Mg$_2$Sn and Mg$_9$Sn$_5$) in which at least one of Ca, Y, La, and Ce is substituted for part of Mg, and at least one of Bi, In, Cr, Ti, Ni, Co, V, Nb, Cu, and Mn is substituted for part of Sn.

Although the granular Mg$_2$Sn phase-containing structure includes a Mg$_2$Sn phase which is a brittle Mg-containing intermetallic compound as described above, the Mg$_2$Sn phase has higher plastic deformability compared to a MgZn$_2$ phase. When a structure is so constructed that the Mg$_2$Sn phase is finely dispersed in a Zn phase having favorable plastic deformability, the structure as a whole expresses favorable plastic deformability to contribute to improvement of the workability. In addition, the Mg$_2$Sn phase serves as a supply source of Mg ions in a corrosive environment, and the Mg ions make the corrosion product to an insulating film, so that corrosion under the paint film in a painted state may be suppressed.

The improving effect of the corrosion resistance after painting and the workability by the granular Mg$_2$Sn phase-containing structure increases as the area fraction of the granular Mg$_2$Sn phase-containing structure existing in the coating layer becomes higher.

When the area fraction of the granular Mg$_2$Sn phase-containing structure is less than 5%, the improvement effect on the corrosion resistance after painting and the workability cannot be obtained. Therefore, the lower limit of the area fraction of the granular Mg$_2$Sn phase-containing structure is set at 5%. From the viewpoint of reliably improving both the corrosion resistance after painting and the workability, the area fraction of the granular Mg$_2$Sn phase-containing structure is preferably 20% or more, and more preferably 30% or more.

Meanwhile, as described above, the higher the area fraction of the granular Mg$_2$Sn phase-containing structure becomes, the greater the effect of improving the corrosion resistance after painting and the workability becomes. Although there is no particular restriction on the upper limit value from the viewpoint of performance, the producible area fraction of the granular $Mg_2Sn$ phase-containing structure is 65% at the maximum due to production restrictions. Therefore, the upper limit of the area fraction of the granular $Mg_2Sn$ phase-containing structure is set at 65%. From the viewpoint of stable production, the area fraction of the granular $Mg_2Sn$ phase-containing structure is preferably 60% or less.

That is, the area fraction of the granular $Mg_2Sn$ phase-containing structure is from 5 to 65%. The area fraction of the granular $Mg_2Sn$ phase-containing structure is preferably from 20 to 60%, and more preferably from 30 to 60%.

[Dendritic Structure: Area Fraction from 35% to 95%]

A dendritic structure is a structure containing a solid solution of Zn and Al. Specifically, a dendritic structure is a structure finely separated to Al phases and Zn phases, and is a structure with the Al concentration of from 15 to 85% and the Zn concentration of from 15 to 85%. Therefore, a dendritic structure is a structure which has fundamentally favorable plastic deformability, and can contribute to improvement of the workability of the coating layer. In addition, it is also a structure contributing to improvement of the seizure resistance.

In order to ensure excellent workability, the area fraction of the dendritic structure is preferably 35% or more. From the viewpoint of imparting excellent workability to the coating layer, the area fraction of the dendritic structure is more preferably 40% or more. Meanwhile, from the viewpoint of production, the upper limit value with respect to the dendritic structure is preferably 95%. From the viewpoint of improving the corrosion resistance after painting and the workability by the granular phase dispersed phase, the dendritic structure occupies preferably 80% or less, more preferably 70% or less.

That is, the area fraction of the dendritic structure is preferably from 35 to 95%, more preferably from 35 or 40 to 80%, and further preferably from 35 or 40 to 70%.

[Massive Zn Phase: Area Fraction from 0% to 20%]

A massive Zn phase is present in an irregular form in the coating layer, and is a massive Zn phase having an equivalent circle diameter of 2 μm or more. The upper limit of the equivalent circle diameter of the massive Zn phase is not particularly limited, but is, for example, 10 μm or less.

As the area fraction of the massive Zn phase increases, the resistance to seizure and the corrosion resistance tend to decrease. Therefore, from the viewpoint of securing the resistance to seizure and the corrosion resistance, the area fraction of the massive Zn phase is preferably 20% or less. From the viewpoint of securing sufficient resistance to seizure and corrosion resistance, the area fraction of the massive Zn phase is more preferably 10% or less. The area fraction of the massive Zn phase is most preferably 0% (namely, it is most preferable that a massive Zn phase is not included).

That is, the area fraction of the massive Zn phase is preferably from 0 to 20%, more preferably from 0 to 10%, and further preferably 0%.

[Massive $MgZn_2$ Phase: Area Fraction from 0% to 20%]

A massive $MgZn_2$ phase is present in an irregular form in the coating layer and is a massive Zn phase having an equivalent circle diameter of 2 μm or more. The upper limit of the equivalent circle diameter of a massive $MgZn_2$ phase is not particularly limited, but is, for example, 10 μm or less.

The massive $MgZn_2$ phase is a brittle phase and tends to become a starting point of cracking at the time of processing. Corrosion may be accelerated in the vicinity of the crack which may cause decrease in corrosion resistance after painting at a processed part. As the area fraction of the massive $MgZn_2$ phase increases, the corrosion resistance after painting and the workability tend to decrease. Therefore, from the viewpoint of securing corrosion resistance after painting and workability, the area fraction of the massive $MgZn_2$ phase is preferably 20% or less. From the viewpoint of securing sufficient corrosion resistance after painting and workability, the area fraction of the massive $MgZn_2$ phase is more preferably 5% or less. The area fraction of the massive $MgZn_2$ phase is most preferably 0% (namely, it is most preferable that a massive $MgZn_2$ phase is not included).

That is, the area fraction of the massive $MgZn_2$ phase is preferably from 0 to 20%, more preferably from 0 to 5%, and further preferably 0%.

[$Zn/Al/MgZn_2$ Ternary Eutectic Structure: Area Fraction from 0% to 3%]

The $Zn/Al/MgZn_2$ ternary eutectic structure is a structure consisting of an Al phase, a Zn phase, and a MgZn phase. Since the size varies depending on the component composition, the shape of each phase is indeterminate. However, since in a eutectic structure, element movement during solidification is suppressed due to transformation at a constant temperature, the respective phases form an intricate pattern, and ordinarily the respective phases finely precipitate (see FIG. 5).

Ordinarily the respective phases are configured such that the Zn phase is large and forms islands, the MgZn phase is second largest and fills the gaps of the Zn phases, and the Al phase is dispersed in a spot pattern among the $MgZn_2$ phases. Although the constituent phases are not changed by the component composition, the positional relationship depends on the component variation just before solidification and there are a case where the $MgZn_2$ phase precipitates to form islands, and a case where the Al phase, or the $MgZn_2$ phase does so.

The method of identifying a ternary eutectic structure will be described later.

With respect to a $Zn/Al/MgZn_2$ ternary eutectic structure, the $MgZn_2$ phase in the ternary eutectic structure, which is brittle and susceptible to corrosion, tends to become a starting point of a crack at the time of processing. Corrosion may be accelerated in the vicinity of the crack, which may cause decrease in the corrosion resistance after painting of a processed part. As the area fraction of the $Zn/Al/MgZn_2$ ternary eutectic structure increases, the corrosion resistance after painting and the workability tend to decrease. Therefore, from the viewpoint of securing corrosion resistance after painting and workability, the area fraction of the $Zn/Al/MgZn_2$ ternary eutectic structure is preferably 3% or less. From the viewpoint of securing sufficient corrosion resistance after painting and workability, the area fraction of the $Zn/Al/MgZn_2$ ternary eutectic structure is most preferably 0% (namely, it is most preferable that the $Zn/Al/MgZn_2$ ternary eutectic structure is not included).

That is, the area fraction of the $Zn/Al/MgZn_2$ ternary eutectic structure is preferably from 0 to 3%, and most preferably 0%.

The thickness of the coating layer is, for example, about 100 μm or less. Since the thickness of the entire coating layer depends on the coating conditions, the upper limit and the lower limit of the thickness of the entire coating layer are not particularly restricted. For example, the thickness of the entire coating layer is related to the viscosity and the specific gravity of the coating bath in the conventional hot-dip metal coating method. Further, the coating amount in terms of weight per unit area may be adjusted by the drawing speed of the steel sheet (original sheet for coating) and the intensity of the wiping. Therefore, the lower limit of the thickness of the entire coating layer is, for example, about 2 μm. Meanwhile, the thickness of the coating layer, which can be produced by a hot-dip metal coating method, is about 95 μm due to the own weight and uniformity of the coating metal.

Therefore, the thickness of the coating layer is preferably from 2 to 95 μm.

Next, an interfacial alloy layer will be described.

The coated steel sheet of the present disclosure may further have an interfacial alloy layer composed of an Al—Fe intermetallic compound between the steel sheet and the coating layer. Generally, an interfacial alloy layer composed of an Al—Fe intermetallic compound of 3 μm or less is formed between the coating layer and the steel sheet. However, an interfacial alloy layer is not necessarily formed depending on the formation conditions of a coating layer.

The interfacial alloy layer preferably has a thickness of 100 nm or more in order to ensure the adhesion between the steel substrate (steel sheet) and the coating layer. Meanwhile, since the Al—Fe intermetallic compound composing the interfacial alloy layer is a brittle intermetallic compound, when the thickness of the interfacial alloy layer exceeds 1.5 μm, the resistance to chipping may be reduced.

Therefore, when the coated steel sheet of the present disclosure has an interfacial alloy layer, the thickness of the interfacial alloy layer is preferably from 100 nm to 1.5 μm.

Since the interfacial alloy layer is in a solid state in which Si is dissolved, it has a role of suppressing an alloying reaction between the coating layer and the steel substrate.

In this regard, the interfacial alloy layer composed of the Al—Fe intermetallic compound is a layer in which the $Al_5Fe$ phase is the main phase. The Al—Fe alloy layer is formed by mutual atomic diffusion of the steel substrate (steel sheet) and the coating bath. However, the interfacial alloy layer may partially contain only a small amount of an AlFe phase, an $Al_3Fe$ phase, an $Al_5Fe_2$ phase, or the like.

The interfacial alloy layer may also contain various elements such as Zn or Si, which are components of the coating layer. In particular, when Si is incorporated into the interfacial alloy layer, an Al—Fe—Si intermetallic compound is formed in the interfacial alloy layer.

Furthermore, when an original sheet for coating out of various kinds of pre-coated steel sheet is used, the interfacial alloy layer may include a pre-coating component (for example, Ni). When the pre-coating component (for example, Ni) is incorporated into an interfacial alloy layer, an Al—Fe—Ni intermetallic compound is formed in the interfacial alloy layer.

That is, the interfacial alloy layer composed of an Al—Fe intermetallic compound means a layer which includes the above-described various modes of alloy layers besides the alloy layer constituted mainly with an $Al_5Fe$ phase An example of the method of producing the coated steel sheet of the present disclosure will be described below.

The coated steel of the present disclosure is obtained by forming a coating layer on the surface (that is, one side or both sides) of an original sheet for coating by a hot-dip metal coating method.

As a method of producing a coated steel sheet according to the present disclosure, a Sendzimir method, a pre-coating method, or the like may be applied. When Ni is used as a type of pre-coating, Ni may be contained in an "Interfacial alloy layer composed of an Al—Fe intermetallic compound" which may be formed when the coating layer is heated.

A coating bath is formed by mixing a pure metal or an alloy into the range of the chemical composition of the above-mentioned coating layer, and melting the same in a range of 450 to 650° C. as an initial make-up of electrolytic bath.

Then, an original sheet for coating whose surface is sufficiently reduced is immersed in the coating bath which is kept at a predetermined bath temperature after the initial make-up of electrolytic bath, taken out, and then cooled down thereby completing a coating layer on the surface of the original sheet for coating (steel sheet). For regulating the coating amount of the coating layer, for example, wiping with a $N_2$ gas is performed immediately after the original sheet for coating is taken out from the coating bath.

In this regard, the cooling rate in the temperature range from immediately after removal of the original sheet for coating from the coating bath (that is, the coating bath temperature) to 320° C. is set at 10° C./s or more, and the cooling rate in the temperature range of from 320° C. to 280° C. is set at 6° C./s or less.

The backscattered electron image (BSE image) with an SEM of the cross section of the coating layer of the coated steel sheet of the present disclosure shown in FIG. 1 is a backscattered electron image (BSE image) with an SEM of the cross section of the coating layer of the coated steel sheet prepared using the cooling rate of 10° C./s in the temperature range from the temperature of the coating bath to 320° C., and the cooling rate of 6° C./s in the temperature range of from 320° C. to 280° C.

As shown in FIG. 1, under the above-described cooling conditions, a structure having a granular $Mg_2Sn$ phase-containing structure 4 and a dendritic structure 5 in the coating layer is formed.

Meanwhile, even when the cooling rate in the temperature range from immediately after removal of the original sheet for coating from the coating bath (that is, the coating bath temperature) to 320° C. is 10° C./s or more, and the cooling rate in the temperature range of from 320° C. to 280° C. is 6° C./s or less, unless the Sn concentration is appropriate, a sufficient amount of the granular $Mg_2Sn$ phase-containing structure 4 is not necessarily formed. For example, as shown in FIG. 3, when Sn is not contained, the granular $Mg_2Sn$ phase-containing structure 4 is not formed in the coating layer 1, rather, a $Zn/Al/MgZn_2$ ternary eutectic structure 9 is formed together with a dendritic structure 5

In addition, in a case where the cooling rate is not changed between the temperature range from immediately after removal of the original sheet for coating from the coating bath (that is, the coating bath temperature) to 320° C., and the temperature range of from 320° C. to 280° C., a sufficient amount of the granular $Mg_2Sn$ phase-containing structure 4 is not necessarily formed.

For example, in the case of the cooling rate condition where the cooling rate is not changed in the above ranges, as shown in FIG. 4, a granular $Mg_2Sn$ phase-containing structure 4 is not formed in the coating layer 1. Instead, a structure 11 in which a plate-like $Mg_2Sn$ phase is mixed in the Zn phase is formed.

Although the detailed formation mechanism of this structure 11 is not clear, when the cooling rate A in the temperature range from immediately after removal of the original sheet for coating from the coating bath (that is, the coating bath temperature) to 320° C. is 10° C./s or higher, and the cooling rate B in the temperature range of from 320° C. to 280° C. is higher than 6° C./s, a sufficient time for the $Mg_2Sn$ phase to spheroidize is hardly secured. When the cooling rate A is less than 10° C./s, and the cooling rate B is 6° C./s or less, the solidification behavior which principally proceeds in a non-equilibrium state nears the equilibrium state, and nucleation for spheroidization of the $Mg_2Sn$ phase hardly occurs. As a result, it is considered that a plate-like $Mg_2Sn$ phase is formed.

The method of analyzing the chemical composition and the metal structure of the coated steel sheet of the present disclosure will be described below.

The chemical component of a coating layer is measured by the following method.

Firstly, calibration curves for quantitatively analyzing the respective elements are prepared by GDS (radio-frequency glow discharge-optical emission spectroscopy). Thereafter, the chemical components in the depth direction of the coating layer under test are measured.

Specifically, GDS (radio-frequency glow discharge-optical emission spectroscopy) is performed on each standard sample such as a pure metal plate of each element to obtain in advance a calibration curve showing the relationship between the elemental intensity plotted against each elemental concentration.

Meanwhile, several 30 mm square pieces are taken from a sample of the coated steel sheet under test, and used as test pieces for GDS. Argon ion sputtering is performed from the surface layer of the coating layer to obtain an elemental intensity profile in the depth direction. The obtained intensity profile is converted to the elemental concentration with the calibration curve.

In an analysis of the chemical composition by GDS, an analysis area of 4 mmϕ or more is measured at 10 positions or more at a sputtering rate in a range of from 0.04 to 0.1 μm/sec. The average value of the elemental concentration at each place is regarded as the elemental concentration of the chemical composition.

However, at each GDS analysis position, in order to eliminate the influence of an oxide layer on the outermost layer, the 1 μm-deep surface layer of the component profile is ignored, and the average value of each elemental concentration in the depth range of from 1 to 10 μm (5 μm width) is adopted.

The area fraction of a structure (provided, a $Zn/Al/MgZn_2$ ternary eutectic structure is excluded) of the coating layer is measured by the following method.

For measuring the area fraction of a structure of the coating layer, a FE-SEM equipped with an EDS (energy dispersive X-ray analyzer) is used.

A test piece having a cross section (cross section cut in the thickness direction of the coating layer) of 25 mm in the C direction and 15 mm in the L direction is cut out from the coated steel sheet. The obtained test piece is embedded in a resin, and CP (cross session polisher) processing is applied to the cross section of the coating layer to be measured. After the CP processing, a backscattered electron image with an SEM and an element mapping image with an EDS of the cross section of the coating layer are created. For the backscattered electron image with an SEM and the element mapping image with an EDS, the magnification is 5000×, and the visual field size is 50 μm long×200 μm wide.

Each region in a structure is identified based on the backscattered electron image with an SEM and the element mapping image with an EDS.

Next, in the backscattered electron image with an SEM, three values of the gray scale lightness, the hue, and the contrast value displayed by each structure in the coating layer are determined. Since the three values of lightness, hue, and contrast value displayed by each structure reflect the atomic number of the element contained in each structure, higher contents of Al and Mg having a small atomic number tend to display a black color, and the richer in Zn tends to display a white color.

A computer image processing is performed such that a range corresponding to the 3 values to be displayed by each structure included in the coating layer exhibits a specific color (for example, only a specific structure is exhibited as a white image, and then the area (number of pixels), etc. of each structure in the visual field is calculated). By performing this image processing for each phase, the area fraction of each structure in the coating layer occupied in the backscattered electron image from an SEM is determined.

The area fraction of each structure of the coating layer is defined as the average value of the area fractions of the structure measured for each of 5 visual fields in an optional cross section (cross section cut in the thickness direction of the coating layer) according to the above-described operation.

In this regard, the area fraction of a granular $Mg_2Sn$ phase-containing structure is the area fraction of a Zn phase, in the region of which presence of the granular $Mg_2Sn$ phase having a crystal grain size of less than 1 μm in the number density of from 1 to 25/μm$^2$ is confirmed, provided that the area of the granular $Mg_2Sn$ phase is also counted.

The area fraction of a dendritic structure is the area fraction of the region occupied by of a solid solution of Zn and Al (the structure showing the Al concentration of from 15 to 85%, and the Zn concentration of from 15 to 85%).

The area fraction of a massive $MgZn_2$ phase is the area fraction of the $MgZn_2$ phase having an equivalent circle diameter of 1 μm or more.

The area fraction of a massive Zn phase is the area fraction of the Zn phase having an equivalent circle diameter of 2 μm or more.

The average crystal grain size of a granular $Mg_2Sn$ phase is measured as follows. AN SEM backscattered electron image of a cross section of the coating layer obtained with respect to the visual field in a size of 10 μm×10 μm at a magnification of 10000× is visually examined to select granular $Mg_2Sn$ phases having the top five crystal grain sizes out of granular $Mg_2Sn$ phases having the crystal grain size of less than 1 μm recognized in the visual field. This operation is performed for five visual fields, and the arithmetic average of totally 25 crystal grain sizes is regarded as the average crystal grain size of granular $Mg_2Sn$ phases having the crystal grain size of less than 1 μm.

The number density of a granular $Mg_2Sn$ phase is determined by observing an SEM backscattered electron image of a cross section of the coating layer for the visual field in a size of 12 μm×12 μm at a magnification of 10000×, counting the number of grain granular $Mg_2Sn$ phases with a crystal grain size of less than 1 μm present in an optional granular $Mg_2Sn$ phase-containing structure in a size of 12 μm×12 μm, and calculating the number of granular $Mg_2Sn$ phases per unit area (μm$^2$). In this regard, the number density of the granular $Mg_2Sn$ phase is defined as the average value of the number densities of the granular $Mg_2Sn$ phase for each of 5 visual fields in an optional cross section (cross section cut in the thickness direction of the coating layer) obtained according to the above-described operation.

Identification and a measurement of the area fraction of a $Zn/Al/MgZn_2$ ternary eutectic structure in the coating layer are performed by the following method.

First, a structure in an SEM backscattered electron image, in which three phases of an Al phase, a Zn phase, and a $MgZn_2$ phase have formed a eutectic, is identified by the same method as the measurement of the area fraction of each structure in the coating layer. A part of the structure is observed by means of a rectangular visual field in a size of 3 μm×4 μm (diagonal: 5 μm) at a magnification of 30000× (see FIG. 5). In doing so, when two diagonals are drawn in the rectangular visual field, in a case each diagonal crosses a Zn phase 5 or more times, and a MgZn$_2$ phase or an Al phase spreading around the Zn phase 5 or more times, the structure is judged as a ternary eutectic structure. This judgment is based on the fact that a ternary eutectic structure is characterized by a "structure in which each of 3 phases is finely dispersed".

In this regard, in a case where a ternary eutectic structure cannot extend to cover the region of 3 μm×4 μm due to possible uneven distribution of the ternary eutectic structure, or difficulty in forming a ternary eutectic structure, the structure may be divided into a 1 μm-square grid-like pattern, and when each phase is included within a single grid in a number of 1 or more respectively, it may be judged as a ternary eutectic structure.

Next, on the same SEM backscattered electron image as the measurement of the area fraction of each structure in the coating layer (magnification of 5000, visual field size: 50 μm long×200 μm wide), the above operation is repeated to grasp the outline (region) of the ternary eutectic structure while confirming the continuity of the ternary eutectic structure. Then, the area fraction of the grasped ternary eutectic structure in the coating layer occupied in the SEM backscattered electron image is determined.

The area fraction of the ternary eutectic structure is defined as the average value of the area fraction of the ternary eutectic structure obtained in at least five visual fields in an optional cross section (cross section cut in the thickness direction of the coating layer) according to the above-described operation.

The average equivalent circle diameters of a massive MgZn$_2$ phase and a massive Zn phase are measured by the following method.

In the SEM backscattered electron image, in which each structure has been identified in measuring the area fraction of the above structure, the top five equivalent circular diameters are selected with respect to each identified phase type. Then, this operation is performed for five visual fields, and the arithmetic average of totally 25 equivalent circular diameters is defined as the average equivalent circle diameter of a massive MgZn$_2$ phase, or a massive Zn phase.

The thickness of an interfacial alloy layer composed of an Al—Fe intermetallic compound is measured as follows.

In the SEM backscattered electron image, in which each structure has been identified in measuring the area fraction of the above structure (magnification of 5000×, visual field size: 50 μm long×200 μm wide, provided that the visual field include a recognizable interfacial alloy layer), the thickness of the identified interfacial alloy layer is measured at each of optional 5 positions. The arithmetic average of the data at 5 positions is defined as the thickness of the interfacial alloy layer.

A post-treatment applicable to the coated steel sheet of the present disclosure will be described below.

In the coated steel sheet of the present disclosure, a film may be formed on the coating layer. The film may be constituted with one or more layers. Examples of the type of a film directly on the coating layer include a chromate film, a phosphate film, and a chromate-free film. As a chromate treatment, a phosphate treatment, or a chromate-free treatment for forming the above film may be performed by known methods.

As for the chromate treatment, there are an electrolytic chromate treatment in which a chromate film is formed by electrolysis, a reaction type chromate treatment in which a film is formed utilizing a reaction with a material, and a surplus treatment solution is washed away, and a coating type chromate treatment in which a treatment solution is coated on an object and then dried without washing with water to form a film. Any of the above may be used.

Examples of the electrolytic chromate treatment include electrolytic chromate treatments using chromic acid, silica sol, a resin (such as phosphoric acid, acrylic resin, vinyl ester resin, vinyl acetate acrylic emulsion, carboxylated styrene butadiene latex, or diisopropanolamine-modified epoxy resin), and hard silica.

Examples of the phosphate treatment include a zinc phosphate treatment, a calcium zinc phosphate treatment, and a manganese phosphate treatment.

The chromate-free treatment is particularly preferable because it is environmentally-friendly. In the chromate-free treatment, there are an electrolytic chromate-free treatment in which a chromate film is formed by electrolysis, a reaction type chromate-free treatment in which a film is formed utilizing a reaction with a material, and a surplus treatment solution is washed away, and a coating type chromate-free treatment in which a treatment solution is coated on an object and then dried without washing with water to form a film. Any of the treatments may be adopted.

Furthermore, one, or two or more layers of organic resin films may be provided on the film directly on the coating layer. The organic resin is not limited to a specific type, and examples thereof include a polyester resin, a polyurethane resin, an epoxy resin, an acrylic resin, a polyolefin resin, and modified products of these resins. In this regard, the modified product refers to a resin to be obtained by reacting a functional group included in the structure of any of the above resins with another compound (monomer, crosslinking agent, or the like) having a functional group reactive with said functional group in the structure.

As such an organic resin, a single, or a mixture of two or more organic resins (not modified) may be used, or a single, or a mixture of two or more organic resins to be obtained by modifying at least one other organic resin in the presence of at least one organic resin may be used. In addition, the organic resin film may contain an optional coloring pigment or rust prevention pigment. It may be also used after it is formed into an aqueous system by dissolving or dispersing it in water.

EXAMPLES

Example that is an embodiment of the present disclosure will be described below.

As the coating bath, a coating bath in which the components were so adjusted that the chemical composition of the coating layer had the chemical composition shown in Table 1 was prepared. The coating bath temperature was selected in the range of from 465 to 593° C. as shown in Table 1 corresponding to the composition. As an original sheet for coating, a hot rolled steel sheet (carbon concentration 0.2%) having a sheet thickness of 0.8 mm was used. The original sheet was cut into a size of 100 mm×200 mm, and then coated with a self-made batchwise hot-dip metal coating test machine. The sheet temperature was monitored using a thermocouple spot-welded at the center of the original sheet for coating. In a case where Formula (1), which is relevant to the composition balance between Mg and Sn disclosed herein, was satisfied, OK was entered in Table 1, and when the same was not satisfied, NG was entered.

Before immersion in the coating bath, the surface of the original sheet for coating was reduced by a $N_2$-5% $H_2$ gas at 800° C. in a furnace with an oxygen concentration of 20 ppm or less, cooled with a $N_2$ gas, and when the temperature of the sheet to be immersed reached the bath temperature +20° C., the sheet was immersed in the coating bath for about 3 sec. After immersion in the coating bath, the sheet was pulled up at a pulling rate of 100 mm/sec. At the time of pulling up, the coating amount was adjusted with an $N_2$ wiping gas.

After the steel sheet was taking out of the coating bath, the coating layer was cooled from the temperature of the coating bath to room temperature under the conditions written in Table 1 to produce a coated steel sheet.

Further, a commercial hot-dip zinc-coated steel sheet (No. 103 in Table 1), alloyed zinc-coated steel sheet (No. 104 in Table 1), and electrozinc-coated steel sheet (No. 105 in Table 1) were also prepared.

TABLE 1-1

| | | Chemical composition of coating layer (% by mass) | | | | | | | Melting | | Cooling condition | |
|---|---|---|---|---|---|---|---|---|---|---|---|---|
| | | | | | | | Total amount of optional | Optional | Formula | point of coating | Coating bath temp. | Average cooling rate from coating bath temp. to 320° C. | Average cooling rate from 320° C. to 280° C. |
| Class | No. | Zn | Al | Mg | Sn | Si | elements | element | (1) | (° C.) | (° C.) | (° C./sec) | (° C./sec) |
| C | 1 | 84.3 | 14 | 0.5 | 1 | 0.2 | 0 | | OK | 440 | 460 | 10 | 3 |
| C | 2 | 83.7 | 15 | 0.4 | 0.7 | 0.2 | 0 | | OK | 445 | 465 | 10 | 3 |
| E | 3 | 83.8 | 15 | 0.5 | 0.5 | 0.2 | 0 | | OK | 445 | 465 | 10 | 2 |
| E | 4 | 83.3 | 15 | 0.5 | 1 | 0.2 | 0 | | OK | 445 | 465 | 10 | 2 |
| E | 5 | 83.5 | 15 | 0.5 | 1 | 0.05 | 0 | | OK | 445 | 465 | 10 | 2 |
| C | 6 | 83.1 | 15 | 0.5 | 1.2 | 0.2 | 0 | | OK | 445 | 465 | 10 | 10 |
| E | 7 | 78.1 | 20 | 0.5 | 1.2 | 0.2 | 0 | | OK | 475 | 495 | 10 | 2 |
| C | 8 | 76.3 | 22 | 0.5 | 1.2 | 0.01 | 0 | | OK | 480 | 500 | 10 | 2 |
| E | 9 | 75.3 | 22 | 0.5 | 2 | 0.2 | 0 | | NG | 480 | 500 | 10 | 2 |
| E | 10 | 76.1 | 22 | 0.5 | 1.2 | 0.2 | 0 | | OK | 480 | 500 | 10 | 2 |
| C | 11 | 76.3 | 22 | 0.5 | 1.0 | 0.2 | 0 | | OK | 480 | 500 | 2 | 2 |
| E | 12 | 76.1 | 22 | 0.5 | 1.2 | 0.2 | 0 | | OK | 480 | 500 | 10 | 6 |
| E | 13 | 75.1 | 22 | 0.5 | 1.2 | 0.2 | 1 | Bi: 1 | OK | 480 | 500 | 10 | 6 |
| E | 14 | 76.1 | 22 | 0.5 | 1.25 | 0.2 | 0 | | OK | 480 | 500 | 10 | 3 |
| E | 15 | 73.3 | 25 | 0.5 | 1 | 0.2 | 0 | | OK | 487 | 507 | 10 | 3 |
| C | 16 | 67.8 | 25 | 0.5 | 1 | 0.2 | 5.5 | Bi: 5.5 | OK | 487 | 507 | 10 | 3 |
| E | 17 | 68.3 | 30 | 0.5 | 1 | 0.2 | 0 | | OK | 481 | 501 | 10 | 3 |
| C | 18 | 69.3 | 30 | 0.5 | 0 | 0.2 | 0 | | NG | 510 | 530 | 10 | 5 |
| E | 19 | 63.1 | 35 | 0.5 | 1.2 | 0.2 | 0 | | OK | 525 | 545 | 10 | 3 |
| E | 20 | 58.1 | 40 | 0.5 | 1.2 | 0.2 | 0 | | OK | 540 | 560 | 10 | 3 |
| E | 21 | 45.8 | 51 | 0.5 | 1.2 | 1.5 | 0 | | OK | 565 | 585 | 10 | 3 |
| E | 22 | 38.1 | 60 | 0.5 | 1.2 | 0.2 | 0 | | OK | 573 | 593 | 10 | 3 |
| C | 23 | 36.1 | 62 | 0.5 | 1.2 | 0.2 | 0 | | OK | 575 | 595 | 10 | 2 |
| C | 24 | 83.5 | 14 | 1 | 1 | 0.5 | 0 | | OK | 430 | 450 | 10 | 2 |
| E | 25 | 82.8 | 15 | 1 | 1 | 0.2 | 0 | | OK | 445 | 465 | 10 | 3 |
| C | 26 | 82.2 | 17 | 0.1 | 0.5 | 0.2 | 0 | | NG | 456 | 476 | 10 | 2 |
| E | 27 | 77.8 | 20 | 1 | 1 | 0.2 | 0 | | OK | 475 | 495 | 10 | 3 |
| C | 28 | 77.8 | 20 | 1 | 1 | 0.2 | 0 | | OK | 475 | 495 | 3 | 3 |
| E | 29 | 75.8 | 22 | 1 | 1 | 0.2 | 0 | | OK | 480 | 500 | 10 | 3 |
| E | 30 | 74.3 | 22 | 1 | 2.5 | 0.2 | 0 | | OK | 480 | 500 | 10 | 3 |
| C | 31 | 76.8 | 22 | 1 | 0 | 0.2 | 0 | | NG | 480 | 500 | 10 | 5 |
| C | 32 | 74.4 | 22 | 1 | 2.4 | 0.2 | 0 | | OK | 480 | 500 | 10 | 19 |
| E | 33 | 72.1 | 24 | 1 | 2.4 | 0.5 | 0 | | OK | 485 | 505 | 10 | 3 |
| E | 34 | 72.9 | 25 | 0.5 | 1 | 0.2 | 0.4 | Pb: 0.1, In: 0.3 | OK | 487 | 507 | 10 | 3 |
| E | 35 | 70.1 | 26 | 1 | 2.4 | 0.5 | 0 | | OK | 490 | 510 | 10 | 3 |
| E | 36 | 70.1 | 26 | 1 | 2.7 | 0.2 | 0 | | NG | 490 | 510 | 10 | 3 |
| E | 37 | 68.4 | 28 | 1 | 2.4 | 0.2 | 0 | | OK | 505 | 525 | 10 | 3 |
| C | 38 | 67.6 | 29 | 1 | 2.4 | 0 | 0 | | OK | 505 | 525 | 10 | 3 |
| E | 39 | 66.4 | 30 | 1 | 2.4 | 0.2 | 0 | | OK | 510 | 530 | 10 | 3 |
| E | 40 | 58.4 | 38 | 1 | 2.4 | 0.2 | 0 | | OK | 535 | 555 | 10 | 3 |
| C | 41 | 58.6 | 38 | 1 | 2.2 | 0.2 | 0 | | OK | 535 | 555 | 5 | 3 |
| E | 42 | 56.4 | 40 | 1 | 2.4 | 0.2 | 0 | | OK | 540 | 560 | 10 | 3 |
| E | 43 | 56.3 | 40 | 1 | 2.2 | 0.2 | 0.3 | B: 0.1, V: 0.2 | OK | 540 | 560 | 10 | 3 |
| E | 44 | 51.4 | 45 | 1 | 2.4 | 0.2 | 0 | | OK | 555 | 575 | 10 | 3 |
| E | 45 | 45.4 | 51 | 1 | 2.4 | 0.2 | 0 | | OK | 565 | 585 | 10 | 3 |
| E | 46 | 36.4 | 60 | 1 | 2.4 | 0.2 | 0 | | OK | 573 | 593 | 10 | 3 |
| C | 47 | 34.4 | 62 | 1 | 2.4 | 0.2 | 0 | | OK | 575 | 595 | 10 | 3 |
| C | 48 | 34.6 | 60 | 1 | 2.4 | 2 | 0 | | OK | 573 | 593 | 10 | 3 |
| C | 49 | 78.8 | 14 | 2 | 5 | 0.2 | 0 | | OK | 440 | 460 | 10 | 3 |
| E | 50 | 78.0 | 15 | 2 | 5 | 0.05 | 0 | | OK | 445 | 465 | 10 | 3 |

TABLE 1-2

| | | Chemical composition of coating layer(% by mass) | | | | | | | Melting point of coating (° C.) | Coating bath temp. (° C.) | Cooling condition | |
|---|---|---|---|---|---|---|---|---|---|---|---|---|
| | | | | | | | | | | | Average cooling rate from coating bath temp. to 320° C. (° C./sec) | Average cooling rate from 320° C. to 280° C. (° C./sec) |
| Class | No. | Zn | Al | Mg | Sn | Si | Total amount of optional elements | Optional element | Formula (1) | | | | |
| E | 51 | 70.8 | 22 | 2 | 5 | 0.2 | 0 | | OK | 480 | 500 | 10 | 3 |
| C | 52 | 71.0 | 22 | 2 | 5 | 0.01 | 0 | | OK | 480 | 500 | 10 | 3 |
| E | 53 | 68.8 | 22 | 2 | 7 | 0.2 | 0 | | NG | 480 | 500 | 10 | 3 |
| E | 54 | 62.8 | 30 | 2 | 5 | 0.2 | 0 | | OK | 510 | 530 | 10 | 3 |
| E | 55 | 63.4 | 30 | 2 | 4 | 0.2 | 0.4 | Y: 0.4 | OK | 510 | 530 | 10 | 3 |
| E | 56 | 57.8 | 35 | 2 | 5 | 0.2 | 0 | | OK | 528 | 548 | 10 | 3 |
| E | 57 | 52.8 | 40 | 2 | 5 | 0.2 | 0 | | OK | 540 | 560 | 10 | 3 |
| C | 58 | 52.8 | 40 | 2 | 5 | 0.2 | 0 | | OK | 540 | 560 | 2 | 2 |
| E | 59 | 47.8 | 45 | 2 | 5 | 0.2 | 0 | | OK | 555 | 575 | 10 | 3 |
| E | 60 | 40.5 | 51 | 2 | 5 | 1.5 | 0 | | OK | 565 | 585 | 10 | 3 |
| E | 61 | 32.8 | 60 | 2 | 5 | 0.2 | 0 | | OK | 573 | 593 | 10 | 3 |
| C | 62 | 30.8 | 62 | 2 | 5 | 0.2 | 0 | | OK | 575 | 595 | 10 | 3 |
| E | 63 | 74.8 | 15 | 3 | 7 | 0.2 | 0 | | OK | 445 | 465 | 10 | 3 |
| E | 64 | 69.8 | 20 | 3 | 7 | 0.2 | 0 | | OK | 475 | 495 | 10 | 3 |
| E | 65 | 67.8 | 22 | 3 | 7 | 0.2 | 0 | | OK | 480 | 500 | 10 | 3 |
| E | 66 | 64.8 | 22 | 4 | 9 | 0.2 | 0 | | OK | 480 | 500 | 10 | 3 |
| E | 67 | 65.8 | 22 | 3 | 9 | 0.2 | 0 | | NG | 480 | 500 | 10 | 3 |
| E | 68 | 64.8 | 25 | 3 | 7 | 0.2 | 0 | | OK | 488 | 508 | 10 | 3 |
| E | 69 | 59.8 | 30 | 3 | 7 | 0.2 | 0 | | OK | 510 | 530 | 10 | 3 |
| E | 70 | 54.8 | 35 | 3 | 7 | 0.2 | 0 | | OK | 528 | 548 | 10 | 3 |
| E | 71 | 49.8 | 40 | 3 | 7 | 0.2 | 0 | | OK | 555 | 575 | 10 | 3 |
| E | 72 | 44.8 | 45 | 3 | 7 | 0.2 | 0 | | OK | 555 | 575 | 10 | 3 |
| E | 73 | 29.8 | 60 | 3 | 7 | 0.2 | 0 | | OK | 573 | 593 | 10 | 3 |
| C | 74 | 27.6 | 62 | 3 | 7.2 | 0.2 | 0 | | OK | 575 | 595 | 10 | 3 |
| C | 75 | 74.6 | 14 | 5 | 6 | 0.2 | 0.2 | | OK | 440 | 460 | 10 | 3 |
| E | 76 | 72.8 | 15 | 5 | 7 | 0.2 | 0 | | OK | 445 | 465 | 10 | 3 |
| E | 77 | 73.2 | 20 | 5 | 1.5 | 0.2 | 0.1 | La: 0.1, Ca: 0.1 | NG | 475 | 495 | 10 | 3 |
| E | 78 | 69.3 | 25 | 4 | 1.5 | 0.2 | 0 | | NG | 488 | 508 | 10 | 3 |
| C | 79 | 62.8 | 25 | 5 | 7 | 0.2 | 0 | | OK | 488 | 508 | 2 | 2 |
| E | 80 | 57.8 | 30 | 5 | 7 | 0.2 | 0 | | OK | 510 | 530 | 10 | 3 |
| E | 81 | 48.6 | 40 | 4 | 7 | 0.2 | 0.2 | Ce: 0.2 | OK | 555 | 575 | 10 | 3 |
| E | 82 | 37.8 | 50 | 5 | 7 | 0.2 | 0 | | OK | 565 | 585 | 10 | 3 |
| E | 83 | 27.8 | 60 | 5 | 7 | 0.2 | 0 | | OK | 573 | 593 | 10 | 3 |
| C | 84 | 27.8 | 62 | 5 | 5 | 0.2 | 0 | | OK | 575 | 595 | 10 | 3 |
| E | 85 | 77.3 | 15 | 6 | 1.5 | 0.2 | 0 | | NG | 445 | 465 | 10 | 3 |
| E | 86 | 71.8 | 20 | 6 | 1.5 | 0.2 | 0.5 | Sr: 0.5 | NG | 475 | 495 | 10 | 3 |
| E | 87 | 67.1 | 25 | 6 | 1.5 | 0.2 | 0.2 | Co; 0.1, Ti: 0.1 | NG | 488 | 508 | 10 | 3 |
| C | 88 | 64.8 | 25 | 6 | 4 | 0.2 | 0 | | NG | 488 | 508 | 2 | 2 |
| E | 89 | 58.8 | 30 | 6 | 5 | 0.2 | 0 | | NG | 510 | 530 | 10 | 3 |
| E | 90 | 47.6 | 40 | 7 | 5 | 0.2 | 0.2 | Cr: 0.1, Cu: 0.1 | NG | 555 | 575 | 10 | 3 |
| E | 91 | 37.8 | 50 | 7 | 5 | 0.2 | 0 | | NG | 565 | 585 | 10 | 3 |
| E | 92 | 24.8 | 60 | 6 | 9 | 0.2 | 0 | | OK | 573 | 593 | 10 | 3 |
| C | 93 | 74.8 | 14 | 6 | 5 | 0.2 | 0 | | NG | 575 | 595 | 10 | 3 |
| E | 94 | 70.8 | 15 | 7 | 7 | 0.2 | 0 | | OK | 445 | 465 | 10 | 3 |
| E | 95 | 65.6 | 20 | 7 | 7 | 0.2 | 0.2 | Mn: 0.1, Ni: 0.1 | OK | 475 | 495 | 10 | 3 |
| C | 96 | 59.8 | 25 | 8 | 7 | 0.2 | 0 | | NG | 488 | 508 | 10 | 3 |
| C | 97 | 59.8 | 25 | 8 | 7 | 0.2 | 0 | | NG | 488 | 508 | 4 | 4 |
| E | 98 | 52.8 | 30 | 8 | 9 | 0.2 | 0 | | OK | 510 | 530 | 10 | 3 |
| E | 99 | 36.5 | 40 | 8 | 15 | 0.2 | 0.3 | Sb: 0.2, Nb: 0.1 | OK | 555 | 575 | 10 | 3 |
| E | 100 | 23.8 | 50 | 8 | 18 | 0.2 | 0 | | OK | 565 | 585 | 10 | 3 |
| E | 101 | 11.8 | 60 | 8 | 20 | 0.2 | 0 | | OK | 573 | 593 | 10 | 3 |
| C | 102 | 12.8 | 60 | 9 | 18 | 0.2 | 0 | | OK | 573 | 593 | 10 | 3 |
| C | 103 | Commercial Zn coatee steel sheet | | | | | | | | | | | |
| | 104 | Alloyed Zn-coated steel sheet | | | | | | | | | | | |
| | 105 | ElectroZn-coated steel sheet | | | | | | | | | | | |

TABLE 1-3

| | | Structural constitution of coating layer | | | | | | |
|---|---|---|---|---|---|---|---|---|
| | | Granular phase dispersed structure Area fraction (%) | Dendritic structure Area fraction (%) | Zn/Al/MgZn$_2$ ternary eutectic structure Area fraction (%) | Massive MgZn$_2$ phase | | Massive Zn phase | |
| Class | No. | | | | Equivalent circle diameter (μm) | Area fraction (%) | Equivalent circle diameter (μm) | Area fraction (%) |
| C | 1  | 53 | 29 | 0  | —   | 0 | 4 | 18 |
| C | 2  | 41 | 35 | 0  | —   | 0 | 5 | 24 |
| E | 3  | 47 | 38 | 0  | —   | 0 | 8 | 15 |
| E | 4  | 49 | 35 | 0  | —   | 0 | 8 | 16 |
| E | 5  | 44 | 36 | 0  | —   | 0 | 4 | 20 |
| C | 6  | 3  | 37 | 0  | —   | 0 | 3 | 20 |
| E | 7  | 38 | 47 | 0  | —   | 0 | 5 | 15 |
| C | 8  | 51 | 39 | 0  | —   | 0 | 4 | 10 |
| E | 9  | 28 | 56 | 0  | —   | 0 | 4 | 11 |
| E | 10 | 28 | 61 | 0  | —   | 0 | 7 | 11 |
| C | 11 | 0  | 60 | 0  | —   | 0 | 8 | 13 |
| E | 12 | 29 | 61 | 0  | —   | 0 | 5 | 10 |
| E | 13 | 28 | 62 | 0  | —   | 0 | 5 | 10 |
| E | 14 | 26 | 65 | 0  | —   | 0 | 4 | 9  |
| E | 15 | 23 | 69 | 0  | —   | 0 | 3 | 8  |
| C | 16 | 22 | 70 | 0  | —   | 0 | 3 | 8  |
| E | 17 | 24 | 72 | 0  | —   | 0 | 7 | 4  |
| C | 18 | 0  | 52 | 39 | —   | 0 | 7 | 9  |
| E | 19 | 20 | 72 | 0  | —   | 0 | 5 | 8  |
| E | 20 | 21 | 76 | 0  | —   | 0 | 5 | 3  |
| E | 21 | 16 | 80 | 0  | —   | 0 | 7 | 4  |
| E | 22 | 5  | 95 | 0  | —   | 0 | — | 0  |
| C | 23 | 4  | 96 | 0  | —   | 0 | — | 0  |
| C | 24 | 59 | 33 | 0  | —   | 0 | 5 | 8  |
| E | 25 | 65 | 35 | 0  | —   | 0 | — | 0  |
| C | 26 | 2  | 42 | 0  | —   | 0 | 3 | 55 |
| E | 27 | 55 | 45 | 0  | —   | 0 | — | 0  |
| C | 28 | 0  | 60 | 0  | —   | 0 | 8 | 0  |
| E | 29 | 39 | 59 | 0  | 0.6 | 2 | — | 0  |
| E | 30 | 35 | 65 | 0  | —   | 0 | — | 0  |
| C | 31 | 0  | 55 | 39 | —   | 0 | 2 | 6  |
| C | 32 | 0  | 63 | 0  | —   | 0 | — | 0  |
| E | 33 | 32 | 68 | 0  | —   | 0 | — | 0  |
| E | 34 | 24 | 68 | 0  | —   | 0 | 3 | 8  |
| E | 35 | 30 | 70 | 0  | —   | 0 | — | 0  |
| E | 36 | 25 | 71 | 0  | —   | 0 | — | 0  |
| E | 37 | 26 | 74 | 0  | —   | 0 | — | 0  |
| C | 38 | 33 | 67 | 0  | —   | 0 | — | 0  |
| E | 39 | 29 | 71 | 0  | —   | 0 | — | 0  |
| E | 40 | 22 | 77 | 0  | —   | 0 | 4 | 1  |
| C | 41 | 0  | 77 | 0  | —   | 0 | 8 | 0  |
| E | 42 | 21 | 79 | 0  | —   | 0 | — | 0  |
| E | 43 | 22 | 78 | 0  | —   | 0 | — | 0  |
| E | 44 | 22 | 78 | 0  | —   | 0 | — | 0  |
| E | 45 | 10 | 90 | 0  | —   | 0 | — | 0  |
| E | 46 | 5  | 95 | 0  | —   | 0 | — | 0  |
| C | 47 | 2  | 98 | 0  | —   | 0 | — | 0  |
| C | 48 | 5  | 93 | 0  | —   | 0 | — | 0  |
| C | 49 | 60 | 32 | 0  | —   | 0 | 2 | 8  |
| E | 50 | 61 | 36 | 0  | 1   | 2 | — | 1  |

TABLE 1-4

| | | Structural constitution of coating layer | | | | | | |
|---|---|---|---|---|---|---|---|---|
| | | Granular phase dispersed structure Area fraction (%) | Dendritic structure Area fraction (%) | Zn/Al/MgZn$_2$ ternary eutectic structure Area fraction (%) | Massive MgZn$_2$ phase | | Massive Zn phase | |
| Class | No. | | | | Equivalent circle diameter (μm) | Area fraction (%) | Equivalent circle diameter (μm) | Area fraction (%) |
| E | 51 | 35 | 65 | 0 | — | 0 | — | 0  |
| C | 52 | 50 | 40 | 0 | — | 0 | 3 | 10 |
| E | 53 | 25 | 58 | 0 | — | 0 | 4 | 9  |
| E | 54 | 29 | 71 | 0 | — | 0 | — | 0  |
| E | 55 | 30 | 70 | 0 | — | 0 | — | 0  |
| E | 56 | 25 | 74 | 0 | 1 | 1 | — | 0  |
| E | 57 | 24 | 74 | 0 | 1 | 2 | — | 0  |
| C | 58 | 0  | 75 | 1 | — | 0 | 8 | 0  |

TABLE 1-4-continued

Structural constitution of coating layer

| Class | No. | Granular phase dispersed structure Area fraction (%) | Dendritic structure Area fraction (%) | Zn/Al/MgZn$_2$ ternary eutectic structure Area fraction (%) | Massive MgZn$_2$ phase Equivalent circle diameter (μm) | Massive MgZn$_2$ phase Area fraction (%) | Massive Zn phase Equivalent circle diameter (μm) | Massive Zn phase Area fraction (%) |
|---|---|---|---|---|---|---|---|---|
| E | 59 | 20 | 77 | 0 | 2 | 3 | — | 0 |
| E | 60 | 6 | 87 | 0 | 1 | 5 | — | 0 |
| E | 61 | 5 | 92 | 0 | 2 | 3 | — | 0 |
| C | 62 | 5 | 95 | 0 | — | 0 | — | 0 |
| E | 63 | 60 | 35 | 0 | 1 | 5 | — | 0 |
| E | 64 | 50 | 49 | 0 | 2 | 1 | — | 0 |
| E | 65 | 31 | 65 | 0 | 2 | 4 | — | 0 |
| E | 66 | 29 | 60 | 0 | 2 | 9 | — | 0 |
| E | 67 | 25 | 70 | 0 | — | 0 | — | 0 |
| E | 68 | 36 | 63 | 0 | 2 | 1 | — | 0 |
| E | 69 | 31 | 69 | 0 | — | 0 | — | 0 |
| E | 70 | 30 | 67 | 0 | 2 | 3 | — | 0 |
| E | 71 | 24 | 76 | 0 | — | 0 | — | 0 |
| E | 72 | 21 | 75 | 0 | 2 | 4 | — | 0 |
| E | 73 | 5 | 91 | 0 | 1 | 4 | — | 0 |
| C | 74 | 4 | 96 | 0 | — | 0 | — | 0 |
| C | 75 | 55 | 36 | 0 | 2 | 9 | — | 0 |
| E | 76 | 56 | 36 | 0 | 4 | 8 | — | 0 |
| E | 77 | 44 | 49 | 0 | 2 | 7 | — | 0 |
| E | 78 | 38 | 55 | 0 | 2 | 7 | — | 0 |
| C | 79 | 0 | 75 | 0 | 2 | 0 | — | 0 |
| E | 80 | 31 | 61 | 0 | 2 | 8 | — | 0 |
| E | 81 | 24 | 69 | 0 | 5 | 7 | — | 0 |
| E | 82 | 6 | 84 | 0 | 4 | 8 | — | 0 |
| E | 83 | 5 | 86 | 0 | 6 | 9 | — | 0 |
| C | 84 | 3 | 88 | 0 | 3 | 9 | — | 0 |
| E | 85 | 60 | 29 | 0 | 1 | 11 | — | 0 |
| E | 86 | 50 | 39 | 0 | 2 | 11 | — | 0 |
| E | 87 | 36 | 52 | 0 | 2 | 12 | — | 0 |
| C | 88 | 0 | 65 | 0 | 5 | 11 | — | 0 |
| E | 89 | 27 | 61 | 0 | 12 | 12 | — | 0 |
| E | 90 | 20 | 65 | 0 | 14 | 15 | — | 0 |
| E | 91 | 6 | 78 | 0 | 8 | 14 | — | 0 |
| E | 92 | 5 | 82 | 0 | 8 | 13 | — | 0 |
| C | 93 | 51 | 38 | 0 | 5 | 11 | — | 0 |
| E | 94 | 53 | 30 | 0 | 9 | 17 | — | 0 |
| E | 95 | 47 | 35 | 0 | 5 | 18 | — | 0 |
| C | 96 | 32 | 51 | 0 | 9 | 17 | — | 0 |
| C | 97 | 0 | 59 | 0 | 11 | 15 | — | 0 |
| E | 98 | 25 | 56 | 0 | 8 | 19 | — | 0 |
| E | 99 | 22 | 59 | 0 | 4 | 19 | — | 0 |
| E | 100 | 6 | 72 | 0 | 12 | 20 | — | 0 |
| E | 101 | 5 | 75 | 0 | 15 | 20 | — | 0 |
| C | 102 | 5 | 70 | 0 | 15 | 25 | — | 0 |
| C | 103 | Commercial Zn coated steel sheet | | | | | | |
| | 104 | Alloyed Zn-coated steel sheet | | | | | | |
| | 105 | ElectroZn-coated steel sheet | | | | | | |

TABLE 1-5

Structural constitution of coating layer

| Class | No. | Zn phase + plate-like Mg$_2$Sn phase Area fraction (%) | Sn phase Equivalent circle diameter (μm) | Sn phase Area fraction (%) | Si phase Equivalent circle diameter (μm) | Si phase Area fraction (%) | Mg$_2$Si phase Equivalent circle diameter (μm) | Mg$_2$Si phase Area fraction (%) | Other phase Area fraction (%) | Interfacial alloy layer Thickness (μm) |
|---|---|---|---|---|---|---|---|---|---|---|
| C | 1 | 0 | — | 0 | — | 0 | — | 0 | 0 | 0.3 |
| C | 2 | 0 | — | 0 | — | 0 | — | 0 | 0 | 0.3 |
| E | 3 | 0 | — | 0 | — | 0 | — | 0 | 0 | 0.3 |
| E | 4 | 0 | — | 0 | — | 0 | — | 0 | 0 | 0.3 |
| E | 5 | 0 | — | 0 | — | 0 | — | 0 | 0 | 0.3 |
| C | 6 | 40 | — | 0 | — | 0 | — | 0 | 0 | 0.5 |
| E | 7 | 0 | — | 0 | — | 0 | — | 0 | 0 | 0.6 |
| C | 8 | 0 | — | 0 | — | 0 | — | 0 | 0 | 2 |
| E | 9 | 0 | 1 | 5 | — | 0 | — | 0 | 0 | 0.2 |
| E | 10 | 0 | — | 0 | — | 0 | — | 0 | 0 | 0.5 |

TABLE 1-5-continued

<table>
<tr><td colspan="9">Structural constitution of coating layer</td></tr>
<tr><td></td><td></td><td>Zn phase + plate-like</td><td colspan="2">Sn phase</td><td colspan="2">Si phase</td><td colspan="2">Mg$_2$Si phase</td><td>Other phase</td><td>Interfacial</td></tr>
<tr><td>Class</td><td>No.</td><td>Mg$_2$Sn phase Area fraction (%)</td><td>Equivalent circle diameter (μm)</td><td>Area fraction (%)</td><td>Equivalent circle diameter (μm)</td><td>Area fraction (%)</td><td>Equivalent circle diameter (μm)</td><td>Area fraction (%)</td><td>Area fraction (%)</td><td>alloy layer Thickness (μm)</td></tr>
<tr><td>C</td><td>11</td><td>27</td><td>—</td><td>0</td><td>—</td><td>0</td><td>—</td><td>0</td><td>0</td><td>0.5</td></tr>
<tr><td>E</td><td>12</td><td>0</td><td>—</td><td>0</td><td>—</td><td>0</td><td>—</td><td>0</td><td>0</td><td>0.4</td></tr>
<tr><td>E</td><td>13</td><td>0</td><td>—</td><td>0</td><td>—</td><td>0</td><td>—</td><td>0</td><td>0</td><td>0.4</td></tr>
<tr><td>E</td><td>14</td><td>0</td><td>—</td><td>0</td><td>—</td><td>0</td><td>—</td><td>0</td><td>0</td><td>0.3</td></tr>
<tr><td>E</td><td>15</td><td>0</td><td>—</td><td>0</td><td>—</td><td>0</td><td>—</td><td>0</td><td>0</td><td>0.2</td></tr>
<tr><td>C</td><td>16</td><td>0</td><td>—</td><td>0</td><td>—</td><td>0</td><td>—</td><td>0</td><td>2.5</td><td>0.2</td></tr>
<tr><td>E</td><td>17</td><td>0</td><td>—</td><td>0</td><td>—</td><td>0</td><td>—</td><td>0</td><td>0</td><td>0.8</td></tr>
<tr><td>C</td><td>18</td><td>0</td><td>—</td><td>0</td><td>—</td><td>0</td><td>—</td><td>0</td><td>0</td><td>0.4</td></tr>
<tr><td>E</td><td>19</td><td>0</td><td>—</td><td>0</td><td>—</td><td>0</td><td>—</td><td>0</td><td>0</td><td>0.9</td></tr>
<tr><td>E</td><td>20</td><td>0</td><td>—</td><td>0</td><td>—</td><td>0</td><td>—</td><td>0</td><td>0</td><td>1.1</td></tr>
<tr><td>E</td><td>21</td><td>0</td><td>—</td><td>0</td><td>—</td><td>0</td><td>—</td><td>0</td><td>0</td><td>1.2</td></tr>
<tr><td>E</td><td>22</td><td>0</td><td>—</td><td>0</td><td>—</td><td>0</td><td>—</td><td>0</td><td>0</td><td>1.5</td></tr>
<tr><td>C</td><td>23</td><td>0</td><td>—</td><td>0</td><td>—</td><td>0</td><td>—</td><td>0</td><td>0</td><td>1.8</td></tr>
<tr><td>C</td><td>24</td><td>0</td><td>—</td><td>0</td><td>—</td><td>0</td><td>—</td><td>0</td><td>0</td><td>0.2</td></tr>
<tr><td>E</td><td>25</td><td>0</td><td>—</td><td>0</td><td>—</td><td>0</td><td>—</td><td>0</td><td>0</td><td>0.1</td></tr>
<tr><td>C</td><td>26</td><td>0</td><td>1</td><td>1</td><td>—</td><td>0</td><td>—</td><td>0</td><td>0</td><td>0.5</td></tr>
<tr><td>E</td><td>27</td><td>0</td><td>—</td><td>0</td><td>—</td><td>0</td><td>—</td><td>0</td><td>0</td><td>0.1</td></tr>
<tr><td>C</td><td>28</td><td>40</td><td>—</td><td>0</td><td>—</td><td>0</td><td>—</td><td>0</td><td>0</td><td>0.1</td></tr>
<tr><td>E</td><td>29</td><td>0</td><td>—</td><td>0</td><td>—</td><td>0</td><td>—</td><td>0</td><td>0</td><td>0.1</td></tr>
<tr><td>E</td><td>30</td><td>0</td><td>—</td><td>0</td><td>—</td><td>0</td><td>—</td><td>0</td><td>0</td><td>0.1</td></tr>
<tr><td>C</td><td>31</td><td>0</td><td>—</td><td>0</td><td>—</td><td>0</td><td>—</td><td>0</td><td>0</td><td>0.2</td></tr>
<tr><td>C</td><td>32</td><td>37</td><td>—</td><td>0</td><td>—</td><td>0</td><td>—</td><td>0</td><td>0</td><td>0.4</td></tr>
<tr><td>E</td><td>33</td><td>0</td><td>—</td><td>0</td><td>—</td><td>0</td><td>—</td><td>0</td><td>0</td><td>0.1</td></tr>
<tr><td>E</td><td>34</td><td>0</td><td>—</td><td>0</td><td>—</td><td>0</td><td>—</td><td>0</td><td>0</td><td>0.2</td></tr>
<tr><td>E</td><td>35</td><td>0</td><td>—</td><td>0</td><td>—</td><td>0</td><td>—</td><td>0</td><td>0</td><td>0.3</td></tr>
<tr><td>E</td><td>36</td><td>0</td><td>1</td><td>4</td><td>—</td><td>0</td><td>—</td><td>0</td><td>0</td><td>0.5</td></tr>
<tr><td>E</td><td>37</td><td>0</td><td>—</td><td>0</td><td>—</td><td>0</td><td>—</td><td>0</td><td>0</td><td>0.6</td></tr>
<tr><td>C</td><td>38</td><td>0</td><td>—</td><td>0</td><td>—</td><td>0</td><td>—</td><td>0</td><td>0</td><td>2</td></tr>
<tr><td>E</td><td>39</td><td>0</td><td>—</td><td>0</td><td>—</td><td>0</td><td>—</td><td>0</td><td>0</td><td>0.9</td></tr>
<tr><td>E</td><td>40</td><td>0</td><td>—</td><td>0</td><td>—</td><td>0</td><td>—</td><td>0</td><td>0</td><td>1.1</td></tr>
<tr><td>C</td><td>41</td><td>23</td><td>—</td><td>0</td><td>—</td><td>0</td><td>—</td><td>0</td><td>0</td><td>1.2</td></tr>
<tr><td>E</td><td>42</td><td>0</td><td>—</td><td>0</td><td>—</td><td>0</td><td>—</td><td>0</td><td>0</td><td>1</td></tr>
<tr><td>E</td><td>43</td><td>0</td><td>—</td><td>0</td><td>—</td><td>0</td><td>—</td><td>0</td><td>0</td><td>1</td></tr>
<tr><td>E</td><td>44</td><td>0</td><td>—</td><td>0</td><td>—</td><td>0</td><td>—</td><td>0</td><td>0</td><td>1.1</td></tr>
<tr><td>E</td><td>45</td><td>0</td><td>—</td><td>0</td><td>—</td><td>0</td><td>—</td><td>0</td><td>0</td><td>1.2</td></tr>
<tr><td>E</td><td>46</td><td>0</td><td>—</td><td>0</td><td>—</td><td>0</td><td>—</td><td>0</td><td>0</td><td>1.4</td></tr>
<tr><td>C</td><td>47</td><td>0</td><td>—</td><td>0</td><td>—</td><td>0</td><td>—</td><td>0</td><td>0</td><td>1.8</td></tr>
<tr><td>C</td><td>48</td><td>0</td><td>—</td><td>0</td><td>1</td><td>2</td><td>—</td><td>0</td><td>0</td><td>0.1</td></tr>
<tr><td>C</td><td>49</td><td>0</td><td>—</td><td>0</td><td>—</td><td>0</td><td>—</td><td>0</td><td>0</td><td>0.3</td></tr>
<tr><td>E</td><td>50</td><td>0</td><td>—</td><td>0</td><td>—</td><td>0</td><td>—</td><td>0</td><td>0</td><td>0.2</td></tr>
</table>

TABLE 1-6

<table>
<tr><td colspan="9">Structural constitution of coating layer</td></tr>
<tr><td></td><td></td><td>Zn phase + plate-like</td><td colspan="2">Sn phase</td><td colspan="2">Si phase</td><td colspan="2">Mg$_2$Si phase</td><td>Other phase</td><td>Interfacial</td></tr>
<tr><td>Class</td><td>No.</td><td>Mg$_2$Sn phase Area fraction (%)</td><td>Equivalent circle diameter (μm)</td><td>Area fraction (%)</td><td>Equivalent circle diameter (μm)</td><td>Area fraction (%)</td><td>Equivalent circle diameter (μm)</td><td>Area fraction (%)</td><td>Area fraction (%)</td><td>alloy layer Thickness (μm)</td></tr>
<tr><td>E</td><td>51</td><td>0</td><td>—</td><td>0</td><td>—</td><td>0</td><td>—</td><td>0</td><td>0</td><td>0.1</td></tr>
<tr><td>C</td><td>52</td><td>0</td><td>—</td><td>0</td><td>—</td><td>0</td><td>—</td><td>0</td><td>0</td><td>2</td></tr>
<tr><td>E</td><td>53</td><td>0</td><td>1</td><td>8</td><td>—</td><td>0</td><td>—</td><td>0</td><td>0</td><td>0.2</td></tr>
<tr><td>E</td><td>54</td><td>0</td><td>—</td><td>0</td><td>—</td><td>0</td><td>—</td><td>0</td><td>0</td><td>0.1</td></tr>
<tr><td>E</td><td>55</td><td>0</td><td>—</td><td>0</td><td>—</td><td>0</td><td>—</td><td>0</td><td>0</td><td>0.2</td></tr>
<tr><td>E</td><td>56</td><td>0</td><td>—</td><td>0</td><td>—</td><td>0</td><td>—</td><td>0</td><td>0</td><td>0.3</td></tr>
<tr><td>E</td><td>57</td><td>0</td><td>—</td><td>0</td><td>—</td><td>0</td><td>—</td><td>0</td><td>0</td><td>0.5</td></tr>
<tr><td>C</td><td>58</td><td>24</td><td>—</td><td>0</td><td>—</td><td>0</td><td>—</td><td>0</td><td>0</td><td>0.7</td></tr>
<tr><td>E</td><td>59</td><td>0</td><td>—</td><td>0</td><td>—</td><td>0</td><td>—</td><td>0</td><td>0</td><td>1.2</td></tr>
<tr><td>E</td><td>60</td><td>0</td><td>—</td><td>0</td><td>—</td><td>0</td><td>1</td><td>2</td><td>0</td><td>1.4</td></tr>
<tr><td>E</td><td>61</td><td>0</td><td>—</td><td>0</td><td>—</td><td>0</td><td>—</td><td>0</td><td>0</td><td>1.3</td></tr>
<tr><td>C</td><td>62</td><td>0</td><td>—</td><td>0</td><td>—</td><td>0</td><td>—</td><td>0</td><td>0</td><td>2.1</td></tr>
<tr><td>E</td><td>63</td><td>0</td><td>—</td><td>0</td><td>—</td><td>0</td><td>—</td><td>0</td><td>0</td><td>0.1</td></tr>
<tr><td>E</td><td>64</td><td>0</td><td>—</td><td>0</td><td>—</td><td>0</td><td>—</td><td>0</td><td>0</td><td>0.2</td></tr>
<tr><td>E</td><td>65</td><td>0</td><td>—</td><td>0</td><td>—</td><td>0</td><td>—</td><td>0</td><td>0</td><td>0.5</td></tr>
<tr><td>E</td><td>66</td><td>0</td><td>2</td><td>2</td><td>—</td><td>0</td><td>—</td><td>0</td><td>0</td><td>0.5</td></tr>
</table>

TABLE 1-6-continued

| | | Structural constitution of coating layer | | | | | | | |
|---|---|---|---|---|---|---|---|---|---|
| | | Zn phase + plate-like | Sn phase | | Si phase | | Mg₂Si phase | | Other phase | Interfacial |
| Class | No. | Mg₂Sn phase Area fraction (%) | Equivalent circle diameter (μm) | Area fraction (%) | Equivalent circle diameter (μm) | Area fraction (%) | Equivalent circle diameter (μm) | Area fraction (%) | Area fraction (%) | alloy layer Thickness (μm) |
| E | 67 | 0 | 1 | 5 | — | 0 | — | 0 | 0 | 0.5 |
| E | 68 | 0 | — | 0 | — | 0 | — | 0 | 0 | 0.2 |
| E | 69 | 0 | — | 0 | — | 0 | — | 0 | 0 | 0.3 |
| E | 70 | 0 | — | 0 | — | 0 | — | 0 | 0 | 0.4 |
| E | 71 | 0 | — | 0 | — | 0 | — | 0 | 0 | 1.3 |
| E | 72 | 0 | — | 0 | — | 0 | — | 0 | 0 | 1.1 |
| E | 73 | 0 | — | 0 | — | 0 | — | 0 | 0 | 1.3 |
| C | 74 | 0 | — | 0 | — | 0 | — | 0 | 0 | 1.7 |
| C | 75 | 0 | — | 0 | — | 0 | — | 0 | 0 | 0.3 |
| E | 76 | 0 | — | 0 | — | 0 | — | 0 | 0 | 0.1 |
| E | 77 | 0 | — | 0 | — | 0 | — | 0 | 0 | 0.2 |
| E | 78 | 0 | — | 0 | — | 0 | — | 0 | 0 | 0.2 |
| C | 79 | 25 | — | 0 | — | 0 | — | 0 | 0 | 0.7 |
| E | 80 | 0 | — | 0 | — | 0 | — | 0 | 0 | 0.3 |
| E | 81 | 0 | — | 0 | — | 0 | — | 0 | 0 | 1.3 |
| E | 82 | 0 | — | 0 | — | 0 | 1 | 2 | 0 | 1.4 |
| E | 83 | 0 | — | 0 | — | 0 | — | 0 | 0 | 1.3 |
| C | 84 | 0 | — | 0 | — | 0 | — | 0 | 0 | 1.7 |
| E | 85 | 0 | — | 0 | — | 0 | — | 0 | 0 | 0.1 |
| E | 86 | 0 | — | 0 | — | 0 | — | 0 | 0 | 0.2 |
| E | 87 | 0 | — | 0 | — | 0 | — | 0 | 0 | 0.2 |
| C | 88 | 24 | — | 0 | — | 0 | — | 0 | 0 | 0.7 |
| E | 89 | 0 | — | 0 | — | 0 | — | 0 | 0 | 0.3 |
| E | 90 | 0 | — | 0 | — | 0 | — | 0 | 0 | 1.3 |
| E | 91 | 0 | — | 0 | — | 0 | 1 | 2 | 0 | 1.4 |
| E | 92 | 0 | — | 0 | — | 0 | — | 0 | 0 | 1.3 |
| C | 93 | 0 | — | 0 | — | 0 | — | 0 | 0 | 0.3 |
| E | 94 | 0 | — | 0 | — | 0 | — | 0 | 0 | 0.1 |
| E | 95 | 0 | — | 0 | — | 0 | — | 0 | 0 | 0.2 |
| C | 96 | 0 | — | 0 | — | 0 | — | 0 | 0 | 0.2 |
| C | 97 | 26 | — | 0 | — | 0 | — | 0 | 0 | 0.7 |
| E | 98 | 0 | — | 0 | — | 0 | — | 0 | 0 | 0.3 |
| E | 99 | 0 | — | 0 | — | 0 | — | 0 | 0 | 1.3 |
| E | 100 | 0 | — | 0 | — | 0 | 1 | 2 | 0 | 1.4 |
| E | 101 | 0 | — | 0 | — | 0 | — | 0 | 0 | 1.3 |
| C | 102 | 0 | — | 0 | — | 0 | — | 0 | 0 | 1.5 |
| C | 103 | Commercial Zn coated steel sheet | | | | | | | | |
| | 104 | Alloyed Zn-coated steel sheet | | | | | | | | |
| | 105 | ElectroZn-coated steel sheet | | | | | | | | |

TABLE 1-7

| | | Bending workability | | | Corrosion resistance after painting | | | | | |
|---|---|---|---|---|---|---|---|---|---|---|
| Class | No. | 1T | 3T | 5T | 30 cycles | 60 cycles | 90 cycles | 150 cycles | Resistance to chipping | Resistance to seizure |
| C | 1 | C | C | B | B | B | C | D | B | D |
| C | 2 | B | B | B | B | B | B | C | A | D |
| E | 3 | B | B | A | A | A | A | B | A | B |
| E | 4 | B | B | A | A | A | A | B | A | B |
| E | 5 | B | B | A | A | A | A | B | A | B |
| C | 6 | C | C | C | A | A | B | C | B | B |
| E | 7 | A | A | A | A | A | A | B | A | B |
| C | 8 | D | D | D | C | C | D | D | D | A |
| E | 9 | A | A | A | A | B | C | D | A | A |
| E | 10 | A | A | A | A | A | A | B | A | B |
| C | 11 | C | C | C | A | A | B | C | B | B |
| E | 12 | A | A | A | A | A | A | B | A | A |
| E | 13 | A | A | A | A | A | A | B | A | A |
| E | 14 | A | A | A | A | A | A | B | A | A |
| E | 15 | A | A | A | A | A | A | B | A | A |
| C | 16 | A | A | A | C | C | D | D | A | A |
| E | 17 | A | A | A | A | A | A | B | A | A |
| C | 18 | D | D | D | C | C | D | D | B | A |
| E | 19 | A | A | A | A | A | A | B | A | A |
| E | 20 | A | A | A | A | A | A | B | A | A |
| E | 21 | A | A | A | A | A | B | B | A | A |
| E | 22 | A | A | A | A | A | B | B | A | A |

TABLE 1-7-continued

| | | Bending workability | | | Corrosion resistance after painting | | | | | |
|---|---|---|---|---|---|---|---|---|---|---|
| Class | No. | 1T | 3T | 5T | 30 cycles | 60 cycles | 90 cycles | 150 cycles | Resistance to chipping | Resistance to seizure |
| C | 23 | C | C | C | A | A | B | C | C | A |
| C | 24 | C | C | C | B | B | C | D | B | D |
| E | 25 | B | B | A | A | A | A | A | A | B |
| C | 26 | B | B | B | C | C | D | D | A | D |
| E | 27 | A | A | A | A | A | A | A | A | A |
| C | 28 | C | C | C | A | A | B | C | B | B |
| E | 29 | A | A | A | A | A | A | A | A | A |
| E | 30 | A | A | A | A | A | A | A | A | A |
| C | 31 | D | D | D | C | C | D | D | B | A |
| C | 32 | C | C | C | A | A | B | C | B | B |
| E | 33 | A | A | A | A | A | A | A | A | A |
| E | 34 | A | A | A | A | A | B | B | A | A |
| E | 35 | A | A | A | A | A | A | A | A | A |
| E | 36 | A | A | A | A | B | C | D | A | A |
| E | 37 | A | A | A | A | A | A | B | A | A |
| C | 38 | C | C | C | A | A | B | C | C | A |
| E | 39 | A | A | A | A | A | A | B | A | A |
| E | 40 | A | A | A | A | A | A | B | A | A |
| C | 41 | C | C | C | A | A | B | C | B | B |
| E | 42 | A | A | A | A | A | A | B | A | A |
| E | 43 | A | A | A | A | A | A | B | A | A |
| E | 44 | A | A | A | A | A | A | B | A | A |
| E | 45 | A | A | A | A | A | B | B | A | A |
| E | 46 | A | A | A | A | A | B | B | A | A |
| C | 47 | C | C | C | A | A | B | C | C | A |
| C | 48 | C | C | C | B | B | C | D | A | A |
| C | 49 | C | C | C | B | B | C | D | B | D |
| E | 50 | B | A | A | A | A | A | A | A | B |

TABLE 1-8

| | | Bending workability | | | Corrosion resistance after painting | | | | | |
|---|---|---|---|---|---|---|---|---|---|---|
| Class | No. | 1T | 3T | 5T | 30 cycles | 60 cycles | 90 cycles | 150 cycles | Resistance to chipping | Resistance to seizure |
| E | 51 | A | A | A | A | A | A | A | A | A |
| C | 52 | D | D | D | B | C | D | D | D | A |
| E | 53 | A | A | A | A | B | C | D | A | A |
| E | 54 | A | A | A | A | A | A | B | A | A |
| E | 55 | A | A | A | A | A | A | B | A | A |
| E | 56 | A | A | A | A | A | A | B | A | A |
| E | 57 | A | A | A | A | A | A | B | A | A |
| C | 58 | C | C | C | A | A | B | C | B | B |
| E | 59 | A | A | A | A | A | A | B | A | A |
| E | 60 | B | A | A | A | A | B | B | A | A |
| E | 61 | A | A | A | A | A | B | B | A | A |
| C | 62 | C | C | C | A | A | B | C | C | A |
| E | 63 | B | B | B | A | A | A | A | A | B |
| E | 64 | A | A | A | A | A | A | A | A | A |
| E | 65 | A | A | A | A | A | A | A | A | A |
| E | 66 | D | B | A | A | B | C | D | B | A |
| E | 67 | A | A | A | A | B | C | D | A | A |
| E | 68 | A | A | A | A | A | A | A | A | A |
| E | 69 | A | A | A | A | A | A | A | A | A |
| E | 70 | A | A | A | A | A | A | A | A | A |
| E | 71 | A | A | A | A | A | A | B | A | A |
| E | 72 | A | A | A | A | A | A | B | A | A |
| E | 73 | A | A | A | A | A | B | B | A | A |
| C | 74 | C | C | C | A | A | B | C | C | A |
| C | 75 | D | C | B | B | B | C | D | B | D |
| E | 76 | D | B | A | A | A | A | A | A | B |
| E | 77 | D | B | A | A | A | A | A | A | A |
| E | 78 | D | B | A | A | A | A | A | A | A |
| C | 79 | D | D | C | A | A | B | C | B | A |
| E | 80 | D | B | A | A | A | A | A | A | A |
| E | 81 | D | B | A | A | A | A | B | A | A |
| E | 82 | D | B | A | A | A | B | B | A | A |
| E | 83 | D | B | A | A | A | B | B | A | A |
| C | 84 | D | C | C | A | A | B | C | C | A |
| E | 85 | D | B | A | A | A | A | A | A | B |
| E | 86 | D | B | A | A | A | A | A | A | A |
| E | 87 | D | B | A | A | A | A | A | A | A |
| C | 88 | D | D | C | A | A | B | C | B | A |

TABLE 1-8-continued

| Class | No. | Bending workability | | | Corrosion resistance after painting | | | | Resistance to chipping | Resistance to seizure |
|---|---|---|---|---|---|---|---|---|---|---|
| | | 1T | 3T | 5T | 30 cycles | 60 cycles | 90 cycles | 150 cycles | | |
| E | 89 | D | B | A | A | A | A | B | A | A |
| E | 90 | D | B | A | A | A | A | B | A | A |
| E | 91 | D | B | A | A | A | B | B | A | A |
| E | 92 | D | B | A | A | A | B | B | A | A |
| C | 93 | D | C | B | B | B | C | D | B | D |
| E | 94 | D | B | A | A | A | A | A | A | B |
| E | 95 | D | B | A | A | A | A | A | A | A |
| C | 96 | D | B | A | A | A | A | A | A | A |
| C | 97 | D | D | C | A | A | B | C | B | A |
| E | 98 | D | B | A | A | A | A | B | A | A |
| E | 99 | D | B | A | A | A | A | B | A | A |
| E | 100 | D | B | A | A | A | B | B | A | A |
| E | 101 | D | B | A | A | A | B | B | A | A |
| C | 102 | D | D | C | A | A | B | C | C | A |
| C | 103 | C | C | C | C | C | C | D | B | D |
| | 104 | D | D | D | C | D | D | D | D | A |
| | 105 | B | B | B | C | C | C | D | C | D |

The following measurements and evaluations were carried out for the coated steel sheets produced in the respective examples, which are summarized in Table 1 above.

Measurement of Area Fraction of Each Structure

The area fractions of the following structures of the coating layer of the obtained coated steel sheet were measured according to the method described above.

Granular Mg$_2$Sn phase-containing structure (denoted as "granular phase-containing structure" in the Table)
Dendritic structure
Zn/Al/MgZn$_2$ ternary eutectic structure
Massive MgZn$_2$ phase with an equivalent circle diameter of 1 μm or more
Massive Zn phase with an equivalent circle diameter of 2 μm or more
Structure in which a plate-like Mg$_2$Sn phase is mixed in a Zn phase (denoted as "Zn phase+plate-like Mg$_2$Sn phase" in the Table)
Sn phase
Si phase
Mg$_2$Si phase
Intermetallic compound phase other than the above structures (denoted as "other phase" in the Table)

Measurement of Average Equivalent Circle Diameter of Each Structure

The average equivalent circle diameters of the following structures of the coating layer of the obtained coated steel sheet were measured according to the method described above. In this regard, in Table 1, the average equivalent circle diameter is denoted as "equivalent circle diameter".

Massive MgZn$_2$ phase with an equivalent circle diameter of 1 μm or more
Massive Zn phase with an equivalent circle diameter of 2 μm or more
Sn phase
Si phase
Mg$_2$Si phase —Measurement of Thickness of Interfacial Alloy Layer—

The thickness of the interfacial alloy layer of the obtained coated steel sheet was measured according to the method described above.

—Crystal Grain Size and Number Density of Granular MgSn Phase in Granular Mg$_2$Sn Phase-Containing Structure—

An SEM backscattered electron image (BSE image) of No. 29 shown in Table 1 was obtained. The SEM backscattered electron image (BSE image) of No. 29 shown in Table 1 is shown in FIG. 1 and FIG. 2. As apparent from FIG. 1, the coating layer 1 was mainly constituted with granular Mg$_2$Sn phase-containing structures 4 and dendritic structures 5. Then, the average crystal grain size and the number density of the granular Mg$_2$Sn phase 8 formed in the granular Mg$_2$Sn phase-containing structure 4 shown in FIG. 2 were examined.

Similarly, for other samples, the average crystal grain size and the number density of the granular Mg$_2$Sn phase were examined. As a result, typical numerical values of the average crystal grain size and the number density of the granular Mg$_2$Sn phase formed in the granular Mg$_2$Sn phase-containing structure were as shown in the following Table 2.

TABLE 2

| Average crystal grainsize (nm) | Number density (1/μm$^2$) |
|---|---|
| 500 | 7 |
| 900 | 6 |
| 550 | 15 |
| 710 | 9 |
| 350 | 14 |
| 280 | 17 |
| 950 | 2 |

—Bending Workability—

Evaluation of the bending workability of the coating layer was performed as follows.

From the obtained coated steel sheet, a test piece of 30 mm in C direction×60 mm in L direction (L) was cut out. The test piece was bent by 180° in the C direction (1T bending), and the crest of the worked part of the coating layer was observed with an SEM, and the number of cracks present at the crest (1.6 mm×30 mm) was counted.

A test piece in which three test pieces with the same thickness were sandwiched inside, and a test piece in which five test pieces with the same thickness were sandwiched inside were respectively bent in the C direction by 180° (3T bending and 5T bending). Similarly, the numbers of cracks were counted.

In this regard, at least three samples of each coated steel sheet were prepared, and the bending workability was evaluated by calculating the average number of the existing cracks. It can be so evaluated that the smaller average number of the cracks indicates the better plastic deformability and therefore the better bending workability.

The rating criteria were: in a case where the average number of crack was 0, namely there was no crack, it was rated as "A"; in a case where the average number of cracks was from 1 to 20, it was rated as "B"; in a case where the average number of cracks was from 21 to 100, it was rated as "C"; and in a case where the average number of cracks was 101 or more, it was rated as "D".

Evaluation of Corrosion Resistance after Painting

Evaluation of the corrosion resistance after painting of the coating layer was performed as follows.

From the obtained coated steel sheet, a test piece of 50 mm in C direction×100 mm in L direction was cut out. A Zn phosphoric acid treatment (SD5350 system: Specifications of Nipponpaint Industrial Coatings Co., Ltd.) was applied to the surface of the coating layer of the test piece.

Next, a 20 μm-thick paint film was formed on the Zn phosphoric acid-treated surface of the coating layer of the test piece by electropainting (PN110 POWERNIX Gray: Specifications of Nipponpaint Industrial Coatings Co., Ltd.), and baked at a baking temperature of 150° C. for 20 min to form an electrodeposited film.

Next, cross cuts (two cuts of 40×√2) reaching the steel substrate (steel sheet) were made in the electrodeposited film of the test piece.

The obtained test piece was subjected to a combined cyclic corrosion test according to JASO (M609-91). And the maximum blistering widths at 8 positions around the cross cuts respectively after execution of 30, 60, 90, and 150 cycles were measured, and the average value was calculated.

The corrosion resistance after painting was rated by this blistering width. The rating criteria were: respectively after execution of 30, 60, 90, and 150 cycles according to JASO (M609-91), in a case where the blistering width from the cross cut was 1 mm or less, it was rated as "A"; in a case where the same was more than 1 mm but not more than 2 mm, it was rated as "B", in a case where the same was more than 2 mm but not more than 4 mm, it was rated as "C"; and in a case where red rust appeared, it was rated as "D".

Evaluation of Resistance to Chipping

Evaluation of the resistance to chipping of a coating layer was performed as follows.

A test piece with a coating layer, which surface was provided with an electrodeposition coating, was prepared in the same manner as in the evaluation of corrosion resistance after painting. On the electrodeposition coating surface, further intermediate painting, top coat painting, and clear painting were conducted to form the respective paint films, such that the total film thickness became 40 μm.

Using a Gravel Test Instrument (manufactured by Suga Test Instruments Co., Ltd.) 100 g of No. 7 crushed stone was blasted against the paint film of the test piece cooled to −20° C. at a collision angle of 90° with an air pressure of 3.0 kg/cm$^2$ from a distance of 30 cm. Then detached regions of the coating layer in the collided area were exposed using an adhesive tape, and the diameters of the detached regions were measured. The top five largest detachment diameters were selected and the average value thereof was regarded as the average detachment diameter.

The resistance to chipping was evaluated by this average detachment diameter. The smaller average detachment diameter means the better resistance to chipping.

The rating criteria were: in a case where the average detachment diameter was less than 1.0 mm, it was rated as "A"; in a case where the average detachment diameter was not less than 1.0 mm but less than 1.5 mm, it was rated as "B"; in a case where the average detachment diameter was not less than 1.5 mm but less than 3.0, it was rated as "C"; and in a case where the average detachment diameter was not less than 3.0 mm, it was rated as "D".

Evaluation of Resistance to Seizure

Evaluation of the resistance to seizure of a coating layer was performed as follows.

Each two test pieces of 80 mm in the C direction and 350 mm in the L direction were cut out from the obtained coated steel sheet. A draw-bead working was applied to the two test pieces using jigs that simulate a die and a bead, such that sliding occurred over the length of 150 mm or more between the coating forming layer forming surface of the test piece and the die shoulder as well as the bead portion. In this case, the radii of curvature of the die shoulder and the bead portion, which were used as jigs in the test, were 2 mmR and 5 mmR respectively, the pushing pressure of the die was 60 kN/m$^2$, and the drawing rate in the draw-bead working was 2 m/min. Further, at the time of the test, a lubricating oil (550S, produced by Nihon Parkerizing Co., Ltd.) was applied on to both the surfaces of the test piece at, in total, 10 mg/m$^2$.

Then, each two primary test pieces of 80 mm wide×350 mm long were sampled, and a draw-bead working was applied to them using jigs that simulate a die and a bead, such that sliding occurred over the length of 150 mm or more between a surface treated surface of the steel sheet and the die shoulder as well as the bead portion for evaluation of the resistance to seizure. In this case, the radii of curvature of the die shoulder and the bead portion, which were used as jigs in the test, were 2 mmR and 5 mmR respectively, the pushing pressure of the die was 60 kN/m$^2$, and the drawing rate in the draw-bead working was 2 m/min. Further, at the time of the test, a lubricating oil (550S, produced by Nihon Parkerizing Co., Ltd.) was applied on to both the surfaces of the test piece at, in total, 0.5 g/m$^2$.

The rating criteria were: in a case where there was no visually recognizable seizure between the coating layer and the die or bead, it was rated as "A"; in a case where there was visually recognizable mild seizure between the coating layer and the die or bead, it was rated as "B"; and in a case where there was visually recognizable significant seizure between the coating layer and the die or bead, it was rated as "D".

The respective symbols in the figures refer to the following:

1 Coating layer
2 Steel sheet
3 Interfacial alloy layer
4 Granular $Mg_2Sn$ phase-containing structure
5 Structure (dendritic structure) including solid solutions of Zn and Al
6 Massive $MgZn_2$ phase
7 Zn phase
8 Granular $Mg_2Sn$ phase
9 $Zn/Al/MgZn_2$ ternary eutectic structure
10 Massive Zn phase
11 Structure in which plate-like $Mg_2Sn$ phase is mixed in Zn phase
20 Zn phase in $Zn/Al/MgZn_2$ ternary eutectic structure
21 $MgZn_2$ phase in $Zn/Al/MgZn_2$ ternary eutectic structure
22 Al phase in $Zn/Al/MgZn_2$ ternary eutectic structure The disclosure of Japanese Patent Application 2017-053150 is incorporated herein by reference in its entirety.

All the literature, patent application, and technical standards cited herein are also herein incorporated to the same extent as provided for specifically and severally with respect to an individual literature, patent application, and technical standard to the effect that the same should be so incorporated by reference.

The invention claimed is:

1. A coated steel sheet comprising a steel sheet and a coating layer provided on at least a part of a surface of the steel sheet, wherein:
the coating layer has a chemical composition comprising in terms of % by mass:
Al: from 15% to 60%
Mg: from 0.5% to 8.0%
Sn: from 0.5% to 20.0%
Si: from 0.05% to 1.50%
Bi: from 0% to 5.0%,
In: from 0% to 2.0%,
Ca: from 0% to 3.0%,
Y: from 0% to 0.5%,
La: from 0% to 0.5%,
Ce: from 0% to 0.5%,
Cr: from 0% to 0.25%,
Ti: from 0% to 0.25%,
Ni: from 0% to 0.25%,
Co: from 0% to 0.25%,
V: from 0% to 0.25%,
Nb: from 0% to 0.25%,
Cu: from 0% to 0.25%,
Mn: from 0% to 0.25%,
Sr: from 0% to 0.5%,
Sb: from 0% to 0.5%,
Pb: from 0% to 0.5%,
B: from 0% to 0.5%, and
a balance comprising Zn and impurities, wherein:
the coating layer has a granular $Mg_2Sn$ phase-containing structure in an area fraction of from 5 to 65%, and a structure containing a solid solution of Zn and Al, and
the granular $Mg_2Sn$ phase-containing structure is a structure constituted with a Zn phase and a granular $Mg_2Sn$ phase having a crystal grain size of less than 1 μm dispersed in the Zn phase.

2. The coated steel sheet according to claim 1, wherein a content of Mg is from 0.5% to 3.0%, and a content of Sn is from 1.0% to 7.5% in terms of % by mass.

3. The coated steel sheet according to claim 1, wherein a content of Al is from 20% to 60%, a content of Mg is from 1.0% to 2.0%, a content of Sn is from 1.0% to 5.0%, and a content of Si is from 0.05% to 1.0% in terms of % by mass.

4. The coated steel sheet according to claim 1, wherein a content of Sn and a content of Mg satisfy the following Formula (1):

$$Mg \leq Sn \leq 2.5 \times Mg \qquad \text{Formula (1)}$$

wherein, in Formula (1), each atomic symbol indicates a content of the element in terms of % by mass.

5. The coated steel sheet according to claim 1, wherein the area fraction of the granular $Mg_2Sn$ phase-containing structure is from 20% to 60%.

6. The coated steel sheet according to claim 1, wherein the area fraction of the granular $Mg_2Sn$ phase-containing structure is from 30% to 60%.

7. The coated steel sheet according to claim 1, wherein an area fraction of the structure containing a solid solution of Zn and Al is from 35% to 95%.

8. The coated steel sheet according to claim 1, wherein the coating layer has a massive $MgZn_2$ phase with an equivalent circle diameter of 1 μm or more in an area fraction of from 0% to 20%.

9. The coated steel sheet according to claim 1, wherein the coating layer has a massive $MgZn_2$ phase with an equivalent circle diameter of 1 μm or more in an area fraction of from 0% to 5%.

10. The coated steel sheet according to claim 1, wherein the coating layer has a massive Zn phase with an equivalent circle diameter of 2 μm or more in an area fraction of from 0% to 20%.

11. The coated steel sheet according to claim 1, wherein the coating layer has a massive Zn phase with an equivalent circle diameter of 2 μm or more in an area fraction of from 0% to 10%.

12. The coated steel sheet according to claim 1, further comprising an interfacial alloy layer with a thickness of from 100 nm to 1.5 μm consisting of an Al—Fe intermetallic compound between the steel sheet and the coating layer.

13. The coated steel sheet according to claim 2, wherein a content of Al is from 20% to 60%, a content of Mg is from 1.0% to 2.0%, a content of Sn is from 1.0% to 5.0%, and a content of Si is from 0.05% to 1.0% in terms of % by mass.

14. The coated steel sheet according to claim 2, wherein a content of Sn and a content of Mg satisfy the following Formula (1):

$$Mg \leq Sn \leq 2.5 \times Mg \qquad \text{Formula (1)}$$

wherein, in Formula (1), each atomic symbol indicates a content of the element in terms of % by mass.

15. The coated steel sheet according to claim 3, wherein a content of Sn and a content of Mg satisfy the following Formula (1):

$$Mg \leq Sn \leq 2.5 \times Mg \qquad \text{Formula (1)}$$

wherein, in Formula (1), each atomic symbol indicates a content of the element in terms of % by mass.

16. The coated steel sheet according to claim 2, wherein the area fraction of the granular $Mg_2Sn$ phase-containing structure is from 20% to 60%.

17. The coated steel sheet according to claim 3, wherein the area fraction of the granular $Mg_2Sn$ phase-containing structure is from 20% to 60%.

18. The coated steel sheet according to claim 4, wherein the area fraction of the granular $Mg_2Sn$ phase-containing structure is from 20% to 60%.

* * * * *